(12) United States Patent
Wang et al.

(10) Patent No.: US 11,923,685 B2
(45) Date of Patent: Mar. 5, 2024

(54) REACTIVE POWER AND VOLTAGE CONTROL METHOD

(71) Applicants: TSINGHUA UNIVERSITY, Beijing (CN); STATE GRID JIBEI ELECTRIC POWER COMPANY, Beijing (CN)

(72) Inventors: Bin Wang, Beijing (CN); Yanling Du, Beijing (CN); Wenchuan Wu, Beijing (CN); Haitao Liu, Beijing (CN); Hongbin Sun, Beijing (CN); Guannan Wang, Beijing (CN); Qinglai Guo, Beijing (CN); Qi Wang, Beijing (CN); Chenhui Lin, Beijing (CN)

(73) Assignees: TSINGHUA UNIVERSITY, Beijing (CN); STATE GRID JIBEI ELECTRIC POWER COMPANY, Beijing (CN)

( * ) Notice: Subject to any disclaimer, the term of this patent is extended or adjusted under 35 U.S.C. 154(b) by 320 days.

(21) Appl. No.: 17/347,036

(22) Filed: Jun. 14, 2021

(65) Prior Publication Data
US 2021/0391722 A1    Dec. 16, 2021

(30) Foreign Application Priority Data

Jun. 15, 2020    (CN) .......................... 202010542836.X

(51) Int. Cl.
*H02J 3/18*    (2006.01)
*G01R 19/25*    (2006.01)
*G06F 119/06*    (2020.01)
*H02J 3/00*    (2006.01)
*H02J 3/06*    (2006.01)

(52) U.S. Cl.
CPC ........ *H02J 3/1814* (2013.01); *G01R 19/2513* (2013.01); *H02J 3/001* (2020.01); *H02J 3/06* (2013.01); *G06F 2119/06* (2020.01)

(58) Field of Classification Search
CPC . H02J 3/1814; H02J 3/001; H02J 3/06; G01R 19/2513; G06F 2119/06
See application file for complete search history.

(56) References Cited

U.S. PATENT DOCUMENTS 7,660,649 B1 *    2/2010    Hope ..................... G06Q 10/04
                                                      700/28
2018/0041036 A1 *    2/2018    Wu .......................... G06F 17/11

OTHER PUBLICATIONS

Zheng et al., A Fully Distributed Reactive Power Optimization and Control Method for Active Distribution Networks, IEEE Transactions on Smart Grid, vol. 7, No. 2, Mar. 2016 (Year: 2016).*

* cited by examiner

*Primary Examiner* — John E Breene
*Assistant Examiner* — Xiuqin Sun
(74) *Attorney, Agent, or Firm* — Hodgson Russ LLP

(57) ABSTRACT

A reactive power-voltage control method for integrated transmission and distribution networks is provided. The reactive power-voltage control method includes: establishing a reactive power-voltage control model for a power system consisting of a transmission network and a plurality of distribution networks; performing a second order cone relaxation on a non-convex constraint of the plurality of distribution network constraints to obtain the convex-relaxed reactive power-voltage control model; solving the convex-relaxed reactive power-voltage control model to acquire control variables of the transmission network and control variables of each distribution network; and controlling the transmission network based on the control variables of the transmission network and controlling each distribution network based on the control variables of the distribution network, so as to realize coordinated control of the power system.

13 Claims, 1 Drawing Sheet

1

REACTIVE POWER AND VOLTAGE CONTROL METHOD

FIELD

The present disclosure relates to a field of operation and control technology of an electric power system, and more particularly relates to a reactive power-voltage control method.

BACKGROUND

With rapidly increasing of flexible resources at the distribution network, for example, increasing of massive renewable energy resources, a large number of schedulable loads and so on, the distribution network would play more and more important part in the entire power system, also a coupling relationship between the transmission network and the distribution network becomes closer. Traditionally, the transmission network and the distribution network are controlled independently, and security problems such as mismatching of power at boundary of the transmission network and the distribution network, voltage beyond limit may arise. It is desired to coordinately control reactive power voltages of the transmission network and the distribution network.

SUMMARY

A reactive power-voltage control method and apparatus are provided in the present disclosure.

According to a first aspect of embodiments of the present disclosure, there is provided a reactive power-voltage control method, including: establishing a reactive power-voltage control model for a power system consisting of a transmission network and a plurality of distribution networks, in which the plurality of distribution networks are radial in nature, the reactive power-voltage control model comprises an objective function and a plurality of constraints, the objective function is established for minimizing a sum of active power outputs of generators at a slack bus in the transmission network, and the plurality of constraints include a plurality of transmission network constraints, a plurality of distribution network constraints and a plurality of transmission-distribution network boundary constraints; performing a second order cone relaxation on a non-convex constraint of the plurality of distribution network constraints to obtain the convex-relaxed reactive power-voltage control model; solving the convex-relaxed reactive power-voltage control model to acquire control variables of the transmission network and control variables of each distribution network; and controlling the transmission network based on the control variables of the transmission network and controlling each distribution network based on the control variables of the distribution network, so as to realize coordinated control of the power system.

According to a second aspect of embodiments of the present disclosure, there is provided a reactive power-voltage control apparatus, including: a processor; a memory configured to store an instruction executable by the processor; in which the processor is configured to: establish a reactive power-voltage control model for a power system consisting of a transmission network and a plurality of distribution networks, in which the plurality of distribution networks are radial in nature, the reactive power-voltage control model comprises an objective function and a plurality of constraints, the objective function is established for minimizing a sum of active power outputs of generators at a slack bus in the transmission network, and the plurality of constraints include a plurality of transmission network constraints, a plurality of distribution network constraints and a plurality of transmission-distribution network boundary constraints; perform a second order cone relaxation on a non-convex constraint of the plurality of distribution network constraints to obtain the convex-relaxed reactive power-voltage control model; solve the convex-relaxed reactive power-voltage control model to acquire control variables of the transmission network and control variables of each distribution network; and control the transmission network based on the control variables of the transmission network and controlling each distribution network based on the control variables of the distribution network, so as to realize coordinated control of the power system.

According to a third aspect of embodiments of the present disclosure, there is provided a non-transitory computer-readable storage medium having stored therein instructions that, when executed by a processor of a terminal, causes the terminal to perform a reactive power optimization method for running an application program, the reactive power optimization method includes: establishing a reactive power-voltage control model for a power system consisting of a transmission network and a plurality of distribution networks, in which the plurality of distribution networks are radial in nature, the reactive power-voltage control model comprises an objective function and a plurality of constraints, the objective function is established for minimizing a sum of active power outputs of generators at a slack bus in the transmission network, and the plurality of constraints include a plurality of transmission network constraints, a plurality of distribution network constraints and a plurality of transmission-distribution network boundary constraints; performing a second order cone relaxation on a non-convex constraint of the plurality of distribution network constraints to obtain the convex-relaxed reactive power-voltage control model; solving the convex-relaxed reactive power-voltage control model to acquire control variables of the transmission network and control variables of each distribution network; and controlling the transmission network based on the control variables of the transmission network and controlling each distribution network based on the control variables of the distribution network, so as to realize coordinated control of the power system.

The above summary of the present disclosure is not intended to describe each disclosed embodiment or every implementation of the present disclosure. The Figures and the detailed descriptions which follow more particularly exemplify illustrative embodiments.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
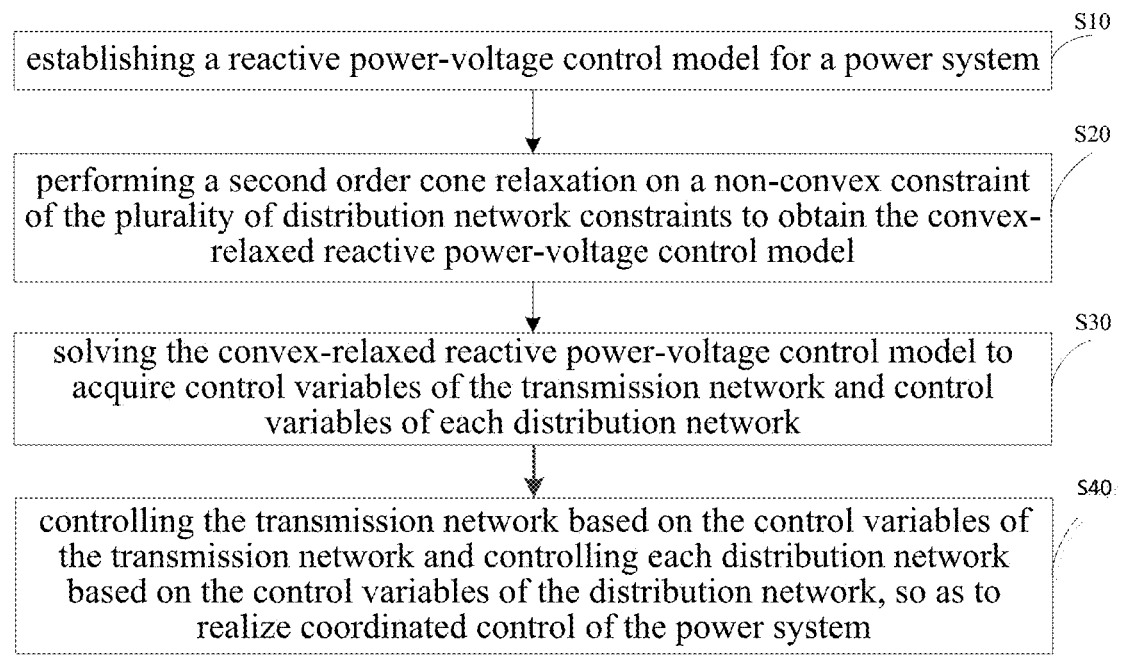
FIG. 1 is a flow chart of a reactive power-voltage control method according to an embodiment of the present disclosure.
Figure 2:
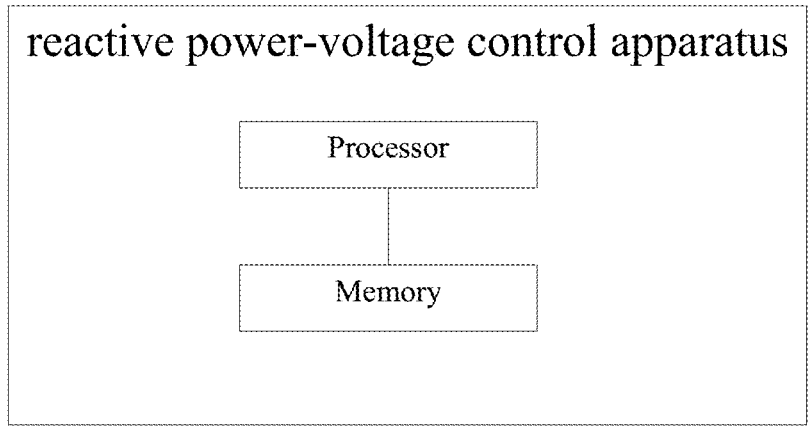
FIG. 2 is a block diagram of a reactive power-voltage control apparatus according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In addition, terms such as "first" and "second" are used herein for purposes of description and are not intended to indicate or imply relative importance or significance. Thus, the feature defined with "first" and "second" may include one or more this feature. In the description of the present disclosure, the term "a plurality of" means two or more than two, unless specified otherwise.

With rapidly increasing of flexible resources at the distribution network, for example, increasing of massive renewable energy resources, a large number of schedulable loads, the distribution network would play more and more important part in the entire power system and a coupling between the transmission network and the distribution network becomes closer. Traditionally, the transmission network and the distribution network are controlled independently, and security problems such as mismatching of power at boundary of the transmission network and the distribution network, voltage beyond limit may arise. It is desired to coordinately control reactive power voltages of the transmission network and the distribution network.

However, since the transmission network and the distribution network are controlled independently by different control centers, it is difficult to realize a centralized control of the transmission network and the distribution network due to privacy information of the different control centers, such that the transmission network and the distribution network need to decompose the reactive power-voltage control and coordinate boundary variables to obtain a global optimum solution.

Further, different distribution networks have different computing powers and communication conditions, such that a problem that the convergence time is too long may arise due to communication delay when using a synchronous distributed algorithm. An asynchronous distributed algorithm may be used to solve the problem, which allows different distribution networks have different update frequencies, and convergence and optimization of the algorithm may be ensured under a certain condition. However, there is a lack of an effective asynchronous distributed algorithm.

In order to overcome deficiencies of the prior art, the present disclosure provides a reactive power-voltage control method for transmission and distribution networks based on an asynchronous alternating direction method of multipliers (ADMM).

In the present disclosure, the reactive power-voltage control of the transmission network and the reactive power-voltage control of the distribution network are solved independently in respective networks, and a control method having the same effect as a centralized reactive power-voltage control is obtained through commutative iteration of boundary information of the transmission and distribution networks. Different frequencies may be used by different distribution networks to perform the commutative iteration with the transmission network, such that the problem of communication delay caused by different computing powers and communication conditions of different distribution networks may be solved. With the reactive power-voltage control method according to embodiments of the present disclosure, a coordinated reactive power-voltage control of the transmission and distribution networks may be realized, such that security risks may be eliminated.

In the following, the reactive power power-voltage control method according to embodiments of the present disclosure will be described in detail with reference to the drawings.

FIG. 1 is a flow chart of a reactive power-voltage control method according to an embodiment of the present disclosure. As shown in FIG. 1, the reactive power-voltage control method includes the following.

In block S10, a reactive power-voltage control model for a power system is established. The power system may include a transmission network and a plurality of distribution networks. The plurality of distribution networks are radial in nature. The reactive power-voltage control model includes an objective function and a plurality of constraints.

In detail, the reactive power-voltage control model can be established as follows.

1.1) determining the objective function of the reactive power-voltage model

Specifically, the objective function is established for minimizing a total network loss of the transmission and distribution networks as follows:

$$\min \sum_{i \in G} P_i^G - \sum_{j \in D} P_j^D \qquad (1)$$

where, G represents a set of indexes of generators in an entire power system comprising the transmission network and all the distribution networks, D represents a set of indexes of loads in the entire power system, $P_i^G$ represents an active power output of an $i^{th}$ generator in G, which is a variable to be solved, and $P_j^D$ represents an active power requirement of a $j^{th}$ load in D, which can be obtained from a load prediction system in the power system.

In a reactive optimization, generators other than generators at a slack bus in the transmission network have a fixed parameter for the active power. Further, the loads have a fixed parameter obtained from the load prediction system. Thus, the active power output of the generators at the slack bus in the transmission network reflect the total network loss, such that configuring the active power output of the generators at the slack bus in the transmission network as the optimization objective is equivalent to configuring the total network loss as the optimization objective, and the objective function may be rewritten as:

$$\min \sum_{i \in G_{PCC}^T} P_i^G \qquad (2)$$

where, $G_{PCC}^T$ represents a set of indexes of the generators at the slack bus in the transmission network.

1.2) determining the constraints of the reactive power-voltage model as follows

The plurality of constraints include a plurality of transmission network constraints, a plurality of distribution network constraints and a plurality of transmission-distribution network boundary constraints.

1.2.1) transmission network constraints

The plurality of transmission network constraints include a polar coordinate power flow constraint, a power input equilibrium constraint, a voltage limit constraint, a generator power output constraint, and a first line capacity constraint.

1.2.1.1) polar coordinate power flow constraint:

$$P_{ij} = \frac{1}{\tau_{ij}^2} g_{ij}^\varepsilon V_i^2 - \frac{1}{\tau_{ij}} V_i V_j [g_{ij}^\varepsilon \cos(\theta_i - \theta_j - \phi_{ij}) + b_{ij}^\varepsilon \sin(\theta_i - \theta_j - \phi_{ij})], \quad (3)$$
$$\forall\, ij \in IL_T$$

$$P_{ji} = g_{ij}^\varepsilon V_j^2 - \frac{1}{\tau_{ij}} V_i V_j [g_{ij}^\varepsilon \cos(\theta_j - \theta_i + \phi_{ij}) + b_{ij}^\varepsilon \sin(\theta_j - \theta_i + \phi_{ij})], \quad (4)$$
$$\forall\, ij \in IL_T$$

$$Q_{ij} = -\frac{1}{\tau_{ij}^2}\left(b_{ij}^\varepsilon + \frac{b_{ij}^C}{2}\right)V_i^2 - \frac{1}{\tau_{ij}} V_i V_j [g_{ij}^\varepsilon \sin(\theta_i - \theta_j - \phi_{ij}) - b_{ij}^\varepsilon \cos(\theta_i - \theta_j - \phi_{ij})],\ \forall\, ij \in IL_T \quad (5)$$

$$Q_{ji} = -\left(b_{ij}^\varepsilon + \frac{b_{ij}^C}{2}\right)V_j^2 - \frac{1}{\tau_{ij}} V_i V_j [g_{ij}^\varepsilon \sin(\theta_i - \theta_j + \phi_{ij}) - b_{ij}^\varepsilon \cos(\theta_i - \theta_j + \phi_{ij})],\ \forall\, ij \in IL_T \quad (6)$$

where $P_{ij}$ represents an active power flowing from an $i^{th}$ bus to a $j^{th}$ bus in the transmission network, which is a variable to be solved. $\tau_{ij}$ represents a transformer ratio of an $(ij)^{th}$ branch in the transmission network, which can be obtained from a transformer specification. $g_{ij}^\varepsilon$ represents an electric conductance of the $(ij)^{th}$ branch in the transmission network, which can be obtained from a line parameter specification of the transmission network. $V_i$ represents a voltage magnitude of the $i^{th}$ bus in the transmission network, which is a variable to be solved. $V_j$ represents a voltage magnitude of the $i^{th}$ bus in the transmission network, which is a variable to be solved. $\theta_i$ represents a voltage phase-angle of the $i^{th}$ bus in the transmission network, which is a variable to be solved. $\theta_j$ represents a voltage phase-angle of the $i^{th}$ bus in the transmission network, which is a variable to be solved. $\phi_{ij}$ represents a transformer phase shifting angle of the $(ij)^{th}$ branch in the transmission network, which can be obtained from the transformer specification. $b_{ij}^\varepsilon$ represents a susceptance of the $(ij)^{th}$ branch in the transmission network, which can be obtained from the line parameter specification of the transmission network. The $(ij)^{th}$ branch represents a branch from the $i^{th}$ bus to the $j^{th}$ bus. $IL_T$ represents a set of indexes of branches in the transmission network. $P_{ji}$ represents an active power flowing from the $j^{th}$ bus to the $i^{th}$ bus in the transmission network, which is a variable to be solved. $Q_{ij}$ represents a reactive power flowing from the $i^{th}$ bus to the $j^{th}$ bus in the transmission network, which is a variable to be solved. $b_{ij}^C$ represents a charging susceptance of the $(ij)^{th}$ branch in the transmission network, which can be obtained from the line parameter specification of the transmission network. $Q_{ji}$ represents a reactive power flowing from the $j^{th}$ bus to the $i^{th}$ bus in the transmission network, which is a variable to be solved.

1.2.1.2) power input equilibrium constraint:

$$\sum_{j \in IG_{Ti}} P_j^G - \sum_{j: ji \in IL_T} P_{ji} - \sum_{j: ij \in IL_T} P_{ij} - P_i^D - V_i^2 g_i^s = 0,\ \forall\, i \in IB_T \quad (7)$$

$$\sum_{j \in IG_{Ti}} Q_j^G - \sum_{j: ji \in IL_T} Q_{ji} - \sum_{j: ij \in IL_T} Q_{ij} - Q_i^D + V_i^2 b_i^s = 0,\ \forall\, i \in IB_T \quad (8)$$

where $IG_{Ti}$ represents a set of indexes of generators connected to the $i^{th}$ bus in the transmission network. $P_j^G$ represents an active power output of a $i^{th}$ generator, which is a variable to be solved. $P_i^D$ represents an active load of the $i^{th}$ bus in the transmission network, which can be obtained from the load prediction system. $g_i^s$ represents a parallel conductance of the $i^{th}$ bus in the transmission network, which can be obtained from the line parameter specification of the transmission network. $IB_T$ represents a set of indexes of buses in the transmission network. $Q_j^G$ represents a reactive power output of the $j^{th}$ generator, which is a variable to be solved. $Q_i^D$ represents a reactive load of the $i^{th}$ bus in the transmission network, which can be obtained from the load prediction system. $b_i^s$ represents a parallel susceptance of the $i^{th}$ bus in the transmission network, which can be obtained from the line parameter specification of the transmission network.

1.2.1.3) voltage limit constraint:

$$\underline{V_i} \le V_i \le \overline{V_i},\ \forall i \in IB_T \quad (9)$$

where $\underline{V_i}$ represents a lower limit of the voltage magnitude of the $i^{th}$ bus in the transmission network, which can be obtained from the line parameter specification of the transmission network. $\overline{V_i}$ represents an upper limit of the voltage magnitude of the $i^{th}$ bus in the transmission network, which can be obtained from the line parameter specification of the transmission network.

1.2.1.4) generator power output constraint:

$$\underline{P_i^G} \le P_i^G \le \overline{P_i^G},\ \underline{Q_i^G} \le Q_i^G \le \overline{Q_i^G},\ \forall i \in IG_T \quad (10)$$

where $IG_T$ represents a set of indexes of generators in the transmission network. $\underline{P_i^G}$ represents a lower limit of an active power of an $i^{th}$ generator, which can be obtained from a specification of respective generator. $\overline{P_i^G}$ represents an upper limit of the active power of the $i^{th}$ generator, which can be obtained from the specification of respective generator. $\underline{Q_i^G}$ represents a lower limit of a reactive power of an $i^{th}$ generator, which can be obtained from the specification of respective generator. $\overline{Q_i^G}$ represents an upper limit of the reactive power of the $i^{th}$ generator, which can be obtained from the specification of respective generator.

1.2.1.5) line capacity:

$$P_{ij}^2 + Q_{ij}^2 \le \overline{S_{ij}}^2,\ P_{ji}^2 + Q_{ji}^2 \le \overline{S_{ij}}^2,\ \forall ij \in IL_T \quad (11)$$

where $\overline{S_{ij}}$ represents an apparent power capacity of the $(ij)^{th}$ branch in the transmission network, which can be obtained from the line parameter specification of the transmission network.

1.2.2) distribution network constraints

The distribution networks are radial in nature. The plurality of distribution network constraints include a branch power flow constraint, a power input equilibrium constraint, a voltage drop constraint, a voltage limit constraint, a generator power output constraint, and a line capacity constraint.

1.2.2.1) branch power flow constraint:

$$P_{D_k,ij}^2 + Q_{D_k,ij}^2 = v_{D_k,i} l_{D_k,ij},\ \forall ij \in IL_{D_k}, \forall k \in ID \quad (12)$$

where $IL_{D_k}$ represents a set of indexes of branches in a $k^{th}$ distribution network of the plurality of distribution networks, ID represents a set of indexes of the plurality of distribution networks. $P_{D_k,ij}$ represents an active power flowing from an $i^{th}$ bus to a $j^{th}$ bus in the $k^{th}$ distribution network, which is a variable to be solved. $Q_{D_k,ij}$ represents a reactive power flowing from an $i^{th}$ bus to a $j^{th}$ bus in the $k^{th}$ distribution network, which is a variable to be solved. $v_{D_k,i}$ represents a square of a voltage magnitude of the $i^{th}$ bus in the $k^{th}$ distribution network, which is a variable to be solved. $l_{D_k,ij}$ represents a square of a current magnitude of an $(ij)^{th}$ branch in the $k^{th}$ distribution network, which is a variable to be solved.

1.2.2.2) power input equilibrium constraint:

$$\sum_{j \in IG_{D_k,i}} P_{D_k,j}^G + \sum_{j: ji \in IL_{D_k}} (P_{D_k,ji} - l_{D_k,ji} R_{D_k,ji}) = \sum_{j: ij \in IL_{D_k}} P_{D_k,ij} + P_{D_k,i}^D, \quad (13)$$
$$\forall i \in IB_{D_k}, \forall k \in ID$$

$$\sum_{j \in IG_{D_k,i}} Q_{D_k,j}^G + \sum_{j: ji \in IL_{D_k}} (Q_{D_k,ji} - l_{D_k,ji} X_{D_k,ji}) = \sum_{j: ij \in IL_{D_k}} Q_{D_k,ij} + Q_{D_k,i}^D, \forall i \in IB_{D_k}, \forall k \in ID \quad (14)$$

where $IG_{D_k,i}$ represents a set of indexes of generators connected to the $i^{th}$ bus in the $k^{th}$ distribution network, $IB_{D_k}$ represents a set of indexes of buses in the $k^{th}$ distribution network. $P_{D_k,j}^G$ represents an active power of a $j^{th}$ generator, which is a variable to be solved. $P_{D_k,ji}$ represents an active power flowing from the $j^{th}$ bus to the $i^{th}$ bus in the $k^{th}$ distribution network, which is a variable to be solved. $l_{D_k,ji}$ represents a square of a current magnitude of a $(ji)^{th}$ branch in the $k^{th}$ distribution network, which is a variable to be solved. $R_{D_k,ji}$ represents a resistance of the $(ji)^{th}$ branch in the $k^{th}$ distribution network, which can be obtained from a line parameter specification of the $k^{th}$ distribution network. $P_{D_k,i}^D$ represents an active load of the $i^{th}$ bus in the $k^{th}$ distribution network, $Q_{D_k,j}^G$ represents a reactive power of the $j^{th}$ generator, which is a variable to be solved. $Q_{D_k,ji}$ represents a reactive power flowing from $j^{th}$ bus to the $i^{th}$ bus in the $k^{th}$ distribution network, which is a variable to be solved. $X_{D_k,ji}$ represents a reactance of the $(ji)^{th}$ branch in the $k^{th}$ distribution network, which can be obtained from a line parameter specification of the $k^{th}$ distribution network. $Q_{D_k,i}^D$ represents a reactive load of the $i^{th}$ bus in the $k^{th}$ distribution network, which can be obtained from the load prediction system.

1.2.2.3) voltage drop constraint:

$$v_{D_k,j} = v_{D_k,i} - 2(R_{D_k,ij} P_{D_k,ij} + X_{D_k,ij} Q_{D_k,ij}) + (R_{D_k,ij}^2 + X_{D_k,ij}^2) l_{D_k,ij}, \forall ij \in IL_{D_k}, \forall k \in ID \quad (15)$$

where $v_{D_k,j}$ represents a square of a voltage magnitude of the $j^{th}$ bus in the $k^{th}$ distribution network, which is a variable to be solved. $R_{D_k,ij}$ represents a resistance of the $(ij)^{th}$ branch in the $k^{th}$ distribution network, which can be obtained from a line parameter specification of the $k^{th}$ distribution network. $X_{D_k,ij}$ represents a reactance of the $(ij)^{th}$ branch in the $k^{th}$ distribution network, which can be obtained from a line parameter specification of the $k^{th}$ distribution network.

1.2.2.4) voltage limit constraint:

$$\underline{v_{D_k,i}} \leq v_{D_k,i} \leq \overline{v_{D_k,i}}, \forall i \in IB_{D_k}, \forall k \in ID \quad (16)$$

where $\underline{v_{D_k,i}}$ represents a lower limit of the square of the voltage magnitude of the $i^{th}$ bus in the $k^{th}$ distribution network, which can be obtained from a line parameter specification of the $k^{th}$ distribution network. $\overline{v_{D_k,i}}$ represents an upper limit of the square of the voltage magnitude of the $i^{th}$ bus in the $k^{th}$ distribution network, which can be obtained from a line parameter specification of the $k^{th}$ distribution network.

1.2.2.5) generator power output constraint:

$$\underline{P_{D_k,i}^G} \leq P_{D_k,i}^G \leq \overline{P_{D_k,i}^G}, \underline{Q_{D_k,i}^G} \leq Q_{D_k,i}^G \leq \overline{Q_{D_k,i}^G}, \forall i \in IG_{D_k}, \forall k \in ID \quad (17)$$

where $IG_{D_k}$ represents a set of indexes of generators in the $k^{th}$ distribution network. $\underline{P_{D_k,i}^G}$ represents a lower limit of the active power of an $i^{th}$ generator, which can be obtained from a specification of the $i^{th}$ generator. $\overline{P_{D_k,i}^G}$ represents an upper limit of the active power of the $i^{th}$ generator, which can be obtained from the specification of the $i^{th}$ generator. $\underline{Q_{D_k,i}^G}$ represents a lower limit of the reactive power of the $i^{th}$ generator, which can be obtained from the specification of the $i^{th}$ generator. $\overline{Q_{D_k,i}^G}$ represents an upper limit of the reactive power of the $i^{th}$ generator, which can be obtained from the specification of the $i^{th}$ generator.

1.2.2.6) line capacity constraint:

$$l_{D_k,ij} \leq \overline{l_{D_k,ij}}, \forall ij \in IL_{D_k}, \forall k \in ID \quad (18)$$

where $\overline{l_{D_k,ij}}$ represents an upper limit of the square of the current magnitude of the $(ij)^{th}$ branch in the $k^{th}$ distribution network, which can be obtained from the line parameter specification of the $k^{th}$ distribution network.

1.2.3) transmission-distribution network boundary constraints:

The transmission-distribution network boundary constraints include an active power matching constraint, a reactive power matching constraint, and a voltage magnitude matching constraint.

1.2.3.1) active power matching constraint:

$$P_{T \to D_k,i}^G = P_{D_k \leftarrow T,i}^G, \forall k \in ID, \forall i \in D_k^{PCC} \quad (19)$$

where $D_k^{PCC}$ represents a set of indexes of boundary buses between the $k^{th}$ distribution network and the transmission network, $P_{T \to D_k,i}^G$ represents an active power transmitted from the transmission network to the $k^{th}$ distribution network via an $i^{th}$ boundary bus connected to the $k^{th}$ distribution network, which is a variable to be solved. $P_{D_k \leftarrow T,i}^G$ represents an active power absorbed by the $k^{th}$ distribution network from the transmission network via the $i^{th}$ boundary bus connected to the transmission network, which is a variable to be solved.

1.2.3.2) reactive power matching constraint:

$$Q_{T \to D_k,i}^G = Q_{D_k \leftarrow T,i}^G, \forall k \in ID, \forall i \in D_k^{PCC} \quad (20)$$

where $Q_{T \to D_k,i}^G$ represents a reactive power transmitted from the transmission network to the $k^{th}$ distribution network via the $i^{th}$ boundary bus connected to the $k^{th}$ distribution network, which is a variable to be solved. $Q_{D_k \leftarrow T,i}^G$ represents a reactive power absorbed by the $k^{th}$ distribution network from the transmission network via the $i^{th}$ boundary bus connected to the transmission network, which is a variable to be solved.

1.2.3.3) voltage magnitude matching constraint:

$$(V_{T,D_k,i})^2 = v_{D_k,T,i}, \forall k \in ID, \forall i \in D_k^{PCC} \quad (21)$$

where $V_{T,D_k,i}$ represents a voltage magnitude of the $i^{th}$ boundary bus connected to the $k^{th}$ distribution network, which is a variable to be solved. $v_{D_k,T,i}$ represents a square of the voltage magnitude of the $i^{th}$ boundary bus connected to the transmission network, which is a variable to be solved.

In block S20, a second order cone relaxation is performed on a non-convex constraint of the plurality of distribution network constraints to obtain the convex-relaxed reactive power-voltage control model.

The second order cone relaxation is performed on the branch power flow constraint i.e., formula (12) to obtain the relaxed branch power flow constraint as follows:

$$P_{D_k,ij}^2 + Q_{D_k,ij}^2 \leq v_{D_k,ij} l_{D_k,ij}, \forall ij \in IL_{D_k}, \forall k \in ID \quad (22)$$

The reactive power-voltage control model is rewritten based on the result of performing the second order cone relaxation on the branch power flow constraint to obtain the convex-relaxed reactive power-voltage control model as follows:

$$\min_{x_T} C_T(x_T) \quad (23)$$

satisfying $$F_T(x_T) \leq 0$$

$$F_{D_k}(x_{D_k}) \leq 0, \forall k \in ID$$

$$x_{T_k,B} = x_{D_k,B}, \forall k \in ID$$

where $x_T$ represents a first column vector containing variables $P_{ij}$, $Q_{ij}$, $P_{ji}$, $Q_{ji}$, $P_i^G$, $Q_i^G$, $V_i$, and $\theta_i$ of the transmission network. $x_{D_k}$ represents a second column vector containing variables $P_{D_k,ij}$, $Q_{D_k,ij}$, $P_{D_k,i}^G$, $Q_{D_k,i}^G$, $v_{D_k,i}$ and $l_{D_k,ij}$ of the $k^{th}$ distribution network. $C_T(X_T)$ represents a sum of active powers absorbed by the transmission bus on at least one common connection bus, i.e., $$\sum_{i \in G_{PCC}^T} P_i^G$$

in me wove formula (2). $F_T(x_T) \leq 0$ represents the plurality of transmission network constraints, including the above formulas (3)-(11). $F_{D_k}(x_{D_k}) \leq 0$ represents the plurality of distribution network constraints having the branch power flow constraint replaced with the relaxed branch power flow constraint, including the above formulas (13)-(18) and (22). $x_{T_k,B} = x_{D_k,B}$ represents the plurality of transmission-distribution network boundary constraints, including the above formulas (19)-(21). $x_{T_k,B}$ represents a third column vector containing variables $P_{T \to D_k,i}^G$, $Q_{T \to D_k,i}^G$ and $(V_{T,D_k,i})^2$ of boundary buses between the transmission network and the $k^{th}$ distribution network. $x_{D_k,B}$ represents a fourth column vector containing variables $P_{D_k \leftarrow T,i}^G$, $Q_{D_k \leftarrow T,i}^G$ and $v_{D_k,T,i}$ of boundary buses between the $k^{th}$ distribution network and the transmission network. It should be noted that, $x_T$ includes $x_{T_k,B}$, and $x_{D_k}$ includes $x_{D_k,B}$.

In block S30, the convex-relaxed reactive power-voltage control model is solved to acquire control variables of the transmission network and control variables of each distribution network.

Specifically, the convex-relaxed reactive power-voltage control model obtained in block S20 is solved as follows.

3.1) the convex-relaxed reactive power-voltage control model, i.e., the above formula (23) is rewritten by an augmented Lagrange method into a following formula:

$$L(x_T, \{x_{D_k}\}_{k \in ID}, \{y_k\}_{k \in ID}) = \quad (24)$$
$$C_T(x_T) + \sum_{k \in ID} \{y_k^T [x_{T_k,B} - x_{D_k,B}] + \frac{\rho}{2} \|x_{T_k,B} - x_{D_k,B}\|_2^2\}$$

where $\{x_{D_k}\}_{k \in ID}$ represents a set of all variables of the plurality distribution networks. $y_k$ represents a fifth column vector containing dual variables (also called as Lagrange multipliers) of the plurality of transmission-distribution network boundary constraints corresponding to the $k^{th}$ distribution network. The superscript T represents a transposition of a vector. $\{y_k\}_{k \in ID}$ represents a set of Lagrange multipliers of the plurality of transmission-distribution network boundary constraints corresponding respectively to the plurality of distribution networks. $\rho$ represents a positive penalty factor. $\|\cdot\|_2^2$ represents a square of 2-Norm of a vector.

3.2) the control variables of the transmission network and the control variables of each distribution network are obtained by an iterative solution method based on an asynchronous distributed algorithm of alternating direction method of multipliers (ADMM).

In detail, the optimum solutions of the reactive power-voltage control may be obtained by the iterative solution method based on the asynchronous distributed algorithm of ADMM as follows.

3.2.1) In the transmission network, let m=1, $\hat{y}_k^m = 0$, $\eta = 0.999$, $\alpha^m = 1$, and $d_k^m = 0$, where m represents a number of iterative steps, $\hat{y}_k^m$ represents a variant of the fifth column vector in an $m^{th}$ iterative step, $\eta$ represents a parameter indicating decrement of residual, $\alpha^m$ represents an initial parameter in the $m^{th}$ iterative step, and $d_k^m$ represents a variable indicating a number of occurrences that the $k^{th}$ distribution network encounters consecutive asynchronism during in $m^{th}$ iterative step. Set values for a residual parameter $u^m$ ($u^1$ is set to be a positive number large enough, in the embodiment, $u^1 = 1e^{10}$), the positive penalty factor $\rho$ (typically, the value of $\rho$ needs to be adjusted manually), a time margin $T_{thr}$ (the value range of $T_{thr}$ depends on the communication condition between the transmission and distribution networks, which may be in a range of [0.5, 5]s), an upper limit $\tau$ of the number of occurrences (the value range of $\tau$ is typically [3, 5]) and a convergence threshold $\varepsilon$ (typically, $\varepsilon = 1e^{-5}$). Assign an initial value to a variant $\hat{x}_{D_k,B}^1$ of the fourth column vector.

3.2.2) During the $m^{th}$ iterative step of the transmission network, a control center of the transmission network solves the reactive power-voltage control model in the following form, for example, by using a commercial solver, such as Cplex, Gurobi:

$$\min_{x_T} C_T(x_T) + \sum_{k \in ID} \{(\hat{y}_k^m)^T [x_{T_k,B} - \hat{x}_{D_k,B}^m] + \frac{\rho}{2} \|x_{T_k,B} - \hat{x}_{D_k,B}^m\|_2^2\} \quad (25)$$

satisfying $$F_T(x_T) \leq 0$$

where $\hat{y}_k^m$ represents a variant of the fifth column vector in the $m^{th}$ iterative step, and $\hat{x}_{D_k,B}^m$ represents a variant of the fourth column vector in the $m^{th}$ iterative step.

3.2.3) The transmission network calculates an optimal solution $X_T^{m+1}$ of formula (25) during the $m^{th}$ iterative step. The control center of the transmission network starts a timer for timing from 0, and transmits the value of variable $x_{T_k,B}^{m+1}$ corresponding to the $k^{th}$ distribution network in the optimal solution $x_T^{m+1}$ to the $k^{th}$ distribution network, where $x_{T_k,B}^{m+1}$ represents $x_{T_k,B}$ obtained in the $m^{th}$ iterative step.

3.2.4) During the $m^{th}$ iterative step of the distribution network, using $x_{T_k,B}^{m+1}$ received from the transmission network, each distribution network solves the reactive power-voltage control model in the following form, for example, by using a commercial solver, such as Cplex, Gurobi:

$$\min_{D_k} \ (\hat{y}_k^m)^T [x_{T_k,B}^{m+1} - x_{D_k,B}] + \frac{\rho}{2} \|x_{T_k,B}^{m+1} - x_{D_k,B}\|_2^2 \quad (26)$$

satisfying $$F_{D_k}(x_{D_k}) \leq 0$$

where $\hat{y}_k^m$ represents a variant of the fifth column vector received from the control center of the transmission network during the $m^{th}$ iterative step (the initial value $\hat{y}_k^1=0$). $x_{T_k,B}^{m+1}$ represents a variant of the third column vector obtained by the transmission network and received from the control center of the transmission network during the $m^{th}$ iterative step. The value of $\rho$ for the $k^{th}$ distribution network is the same as the transmission network.

When there is a communication delay in the process that the control center of the transmission network transmits $x_{T_k,B}^{m+1}$ to the $k^{th}$ distribution network, the $k^{th}$ distribution network may wait, and the step in 3.2.4) is executed until new data is received from the transmission network.

3.2.5) After each distribution network obtains an optimal solution $x_{D_k}^{m+1}$ of formula (26) during the $m^{th}$ iterative step, the control center of the respective distribution network transmits $x_{D_k,B}^{m+1}$ corresponding to the $k^{th}$ distribution network in the optimal solution $x_{D_k}^{m+1}$ to the transmission network, where $x_{D_k,B}^{m+1}$ represents $x_{D_k,B}$ obtained in the $m^{th}$ iterative step.

3.2.6) For each distribution network, the control center of the transmission network determines whether the number of occurrences that the distribution network encounters consecutive asynchronism exceeds the upper limit $\tau$.

3.2.6.1) If the number of occurrences does not exceed the upper limit $\tau$ for each distribution network, the control center of the transmission network waits for $x_{D_k,B}^{m+1}$ from each distribution network within the time margin $T_{thr}$ (starting from the time when the timer is started). A set of indexes of distribution networks from which the distribution network data is received by the control center of the transmission network within the time margin $T_{thr}$ is recorded as $H^m$. For the $k^{th}$ distribution network in ID–$H^m$, the control center of the transmission network uses the latest $x_{D_k,B}^{LV,m}$ received during the last iteration step to replace $x_{D_k,B}^{m+1}$:

$$x_{D_k,B}^{m+1} = \begin{cases} x_{D_k,B}^{m+1}, & \forall k \in H^m \\ x_{D_k,B}^{LV,m}, & \forall k \in (ID - H^m) \end{cases} \quad (27)$$

where $x_{D_k,B}^{m+1}$ represents a latest parameter received by the control center of the transmission network from the $k^{th}$ distribution network during the $m^{th}$ iterative step. $x_{D_k,B}^{LV,m}$ represents a latest parameter received by the control center of the transmission network from the $k^{th}$ distribution network during the $(m-1)^{th}$ iterative step, which may be a value obtained within the time margin $T_{thr}$ or a value in a previous asynchronous iteration step corresponding to the $k^{th}$ distribution network obtained during the $(m-1)^{th}$ iterative step. When both values are received, the value obtained within the time margin $T_{thr}$ is retained based on a flag bit in the data frame.

3.2.6.2) If the number of occurrences exceeds the upper limit $\tau$ for any distribution network, the control center of the transmission network waits for $x_{D_k,B}^{m+1}$ from each distribution network, in this case, $H^m=\text{ID}$. If a plurality of variables $x_{D_k,B}^{m+1}$ are received from the $k^{th}$ distribution network during the $m^{th}$ iterative step, the latest received $x_{D_k,B}^{m+1}$ is retained.

3.2.7) The number of occurrences $d_k^{m+1}$ is updated as follows:

$$d_k^{m+1} = \begin{cases} 0, & \forall k \in H^m \\ d_k^m + 1, & \forall k \in (ID - H^m) \end{cases} \quad (28)$$

where $d_k^{m+1}$ represents the number of occurrences for the $k^{th}$ distribution network after the $m^{th}$ iterative step;

3.2.8) The control center of the transmission network updates Lagrange multiplier corresponding to the $k^{th}$ distribution network as follows:

$$y_k^{m+1} = \hat{y}_k^m + \rho(x_{T_k,B}^{m+1} - x_{D_k,B}^{m+1}) \quad (29)$$

where $y_k^{m+1}$ represents the Lagrange multiplier corresponding to the $k^{th}$ distribution network obtained in the $m^{th}$ iterative step.

3.2.9) The control center of the transmission network updates a primal residual and a dual residual after the $m^{th}$ iterative step as follows:

$$p^{m+1} = \|x_{T,B}^{m+1} - x_{D,B}^{m+1}\|_\infty \quad (30)$$

$$d^{m+1} = \|x_{T,B}^{m+1} - x_{T,B}^m\|_\infty \quad (31)$$

where $p^{m+1}$ represents the primal residual of the reactive power-voltage control model after the $m^{th}$ iterative step, $d^{m+1}$ represents the dual residual of the reactive power-voltage control model after the $m^{th}$ iterative step, $x_{T,B}^{m+1}$ represents a set containing all the third column vector $x_{T_k,B}^{m+1}$, $x_{D,B}^{m+1}$ represents a set containing all the fourth column vector $x_{D_k,B}^{m+1}$, $\|\cdot\|_\infty$ represents a $\infty$-Norm of a vector.

3.2.10) The control center of the transmission network determines whether a convergence condition based on the following formula:

$$\left\| \begin{matrix} p^{m+1} \\ d^{m+1} \end{matrix} \right\|_\infty < \varepsilon \quad (32)$$

Formula (32) means that each element in the primal residual and the dual residual of the reactive power-voltage model in the $m^{th}$ iterative step is less than the convergence threshold.

If yes, the iteration step is terminated, and the optimum solutions $x_T^{m+1}$ and $x_{D_k}^{m+1}$ obtained in the $m^{th}$ iterative step are configured as the final optimum solutions of the reactive power-voltage model, and the process ends.

If no, step 3.2.11) is executed.

3.2.11) The control center of the transmission network updates the residual parameter as follows:

$$u^{m+1} = \rho^{-1}\|y^{m+1} - \hat{y}^m\|_2^2 + \rho\|x_{D,B}^{m+1} - \hat{x}_{D,B}^m\|_2^2 \quad (33)$$

where $u^{m+1}$ represents the residual parameter after the $m^{th}$ iterative step, which reflects a magnitude of the current primal residual and dual residual. $y^{m+1}$ represents a set containing all the Lagrange multipliers $y_k^{m+1}$, $\hat{y}^m$ in represents a set containing all the variants $\hat{y}_k^m$ of the fifth column vectors, $\hat{x}_{D,B}^m$ represents a set containing all the variants $\hat{x}_{D_k,B}^m$ of the fourth column vectors.

3.2.12) The control center of the transmission network determines whether $u^{m+1} < \eta u^m$ is met.

3.2.12.1) If yes, the control center of the transmission network updates the initial parameter, the variant of the fourth column vector, and the variant of the fifth column vector as follows:

$$\alpha^{m+1} = \frac{1 + \sqrt{1 + 4(\alpha^m)^2}}{2} \quad (34)$$

$$\hat{x}_{D_k,B}^{m+1} = x_{D_k,B}^{m+1} + \frac{\alpha^m - 1}{\alpha^{m+1}}\left(x_{D_k,B}^{m+1} - x_{D_k,B}^m\right) \quad (35)$$

$$\hat{y}_k^{m+1} = y_k^{m+1} + \frac{\alpha^m - 1}{\alpha^{m+1}}(y_k^{m+1} - y_k^m) \quad (36)$$

where $\alpha^{m+1}$ represents the parameter after the $m^{th}$ iterative step calculated by the control center of the transmission network. $\hat{x}_{D_k,B}^{m+1}$ represents a variant of the fourth column vector obtained by the control center of the transmission network after the $m^{th}$ iterative step. $\hat{y}_k^{m+1}$ represents a variant of the fifth column vector obtained by the control center of the transmission network after the $m^{th}$ iterative step.

3.2.12.2) If no, the control center of the transmission network updates the initial parameter, the variant of the fourth column vector, and the variant of the fifth column vector as follows:

$$\alpha^{m+1}=1, u^{m+1}=\eta^{-1}u^m, \hat{x}_{D_k,B}^{m+1}=x_{D_k,B}^{m-1}, \hat{y}_k^{m+1}=y_k^{m-1} \quad (37)$$

After updating, the control center of the transmission network transmits $\hat{y}_k^{m+1}$ to the $k^{th}$ distribution network and step 3.2.13) is executed.

3.2.13) Let m=m+1 and return to step (3.2.2).

In block S40, the transmission network is controlled based on the control variables of the transmission network and each distribution network is controlled based on the control variables of the distribution network, so as to realize coordinated control of the power system.

The transmission network and each distribution network are controlled based on the optimum solutions $x_T^{m+1}$ and $x_{D_k}^{m+1}$ obtained in block S30, to realize the coordinated control of the power system.

The technical solutions provided by embodiments of the present disclosure have following advantageous effects.

In the reactive power-voltage control method according to embodiments of the present disclosure, based on the comprehensive consideration of the polar coordinate reactive power-voltage control model of the transmission network and the branch reactive power-voltage control model, and in combination of the matching relation of boundary variables of the transmission network and the distribution network, the transmission and distribution networks coordinated reactive power-voltage control model can be established. Further, in consideration of an actual situation that different distribution networks have different computing powers and communication conditions, the asynchronous distributed iteration solution method for the transmission and distribution networks in the power system is provided to realize decomposition and coordination computation of the transmission and distribution networks coordinated reactive power-voltage control model. The decomposition and coordination control of the reactive power-voltage control model has fast convergence speed, and may eliminate the security problems such as such as mismatching of power at boundary of the transmission network and the distribution network, voltage beyond limit and so on. Thus, the inventive method may realize the coordinated reactive power-voltage control on the transmission and distribution networks, and eliminate security risks. Further, the inventive method has high coordination efficiency, which is easy to be applied actually.

In the following, a reactive power-voltage control apparatus according to embodiments of the present disclosure will be described in detail with reference to the drawings.

In some embodiments of the present disclosure, the reactive power-voltage control apparatus includes a processor; a memory configured to store an instruction executable by the processor, in which the processor is configured to: establish a reactive power-voltage control model for a power system consisting of a transmission network and a plurality of distribution networks, in which the plurality of distribution networks are radial in nature, the reactive power-voltage control model comprises an objective function and a plurality of constraints, the objective function is established for minimizing a sum of active power outputs of generators at a slack bus in the transmission network, and the plurality of constraints include a plurality of transmission network constraints, a plurality of distribution network constraints and a plurality of transmission-distribution network boundary constraints; perform a second order cone relaxation on a non-convex constraint of the plurality of distribution network constraints to obtain the convex-relaxed reactive power-voltage control model; solve the convex-relaxed reactive power-voltage control model to acquire control variables of the transmission network and control variables of each distribution network; and control the transmission network based on the control variables of the transmission network and controlling each distribution network based on the control variables of the distribution network, so as to realize coordinated control of the power system.

In some embodiments of the present disclosure, the objective function is represented as:

$$\min \sum_{i \in G_{PCC}^T} P_i^G$$

where, $G_{PCC}^T$ represents a set of indexes of the generators at the slack bus in the transmission network, and $P_i^G$ represents an $i^{th}$ generator of the generators at the slack bus in the transmission network.

In some embodiments of the present disclosure, the plurality of transmission network constraints comprise a first power flow constraint, a first power input equilibrium constraint, a first voltage limit constraint, a first power output constraint, and a first line capacity constraint.

In some embodiments of the present disclosure, the first power flow constraint is represented as:

$$P_{ij} = \frac{1}{\tau_{ij}^2} g_{ij}^\varepsilon V_i^2 - \frac{1}{\tau_{ij}} V_i V_j [g_{ij}^\varepsilon \cos(\theta_i - \theta_j - \phi_{ij}) + b_{ij}^\varepsilon \sin(\theta_i - \theta_j - \phi_{ij})],$$

$$\forall ij \in IL_T$$

$$P_{ji} = g_{ij}^\varepsilon V_j^2 - \frac{1}{\tau_{ij}} V_i V_j [g_{ij}^\varepsilon \cos(\theta_j - \theta_i + \phi_{ij}) + b_{ij}^\varepsilon \sin(\theta_j - \theta_i + \phi_{ij})], \forall ij \in IL_T$$

$$Q_{ij} = -\frac{1}{\tau_{ij}^2}\left(b_{ij}^\varepsilon + \frac{b_{ij}^C}{2}\right)V_i^2 -$$

-continued $$\frac{1}{\tau_{ij}}V_iV_j[g_{ij}^\varepsilon\sin(\theta_i-\theta_j-\phi_{ij})-b_{ij}^\varepsilon\cos(\theta_i-\theta_j-\phi_{ij})], \forall\ ij\in IL_T$$

$$Q_{ji}=-\left(b_{ij}^\varepsilon+\frac{b_{ij}^C}{2}\right)V_j^2-\frac{1}{\tau_{ij}}V_iV_j[g_{ij}^\varepsilon\sin(\theta_j-\theta_i+\phi_{ij})-b_{ij}^\varepsilon\cos(\theta_j-\theta_i+\phi_{ij})],$$

$$\forall\ ij\in IL_T$$

where $P_{ij}$ represents an active power flowing from an $i^{th}$ bus to a $j^{th}$ bus in the transmission network, $\tau_{ij}$ represents a transformer ratio of an $(ij)^{th}$ branch in the transmission network, $g_{ij}^\varepsilon$ represents an electric conductance of the $(ij)^{th}$ branch in the transmission network, $V_i$ represents a voltage magnitude of the $i^{th}$ bus in the transmission network, $V_j$ represents a voltage magnitude of the $j^{th}$ bus in the transmission network, $\theta_i$ represents a voltage phase-angle of the $i^{th}$ bus in the transmission network, $\theta_j$ represents a voltage phase-angle of the $j^{th}$ bus in the transmission network, $\phi_{ij}$ represents a transformer phase shifting angle of the $(ij)^{th}$ branch in the transmission network, $b_{ij}^\varepsilon$ represents a susceptance of the $(ij)^{th}$ branch in the transmission network, the branch represents a branch from the $i^{th}$ bus to the $j^{th}$ bus, $IL_T$ represents a set of indexes of branches in the transmission network, $P_{ji}$ represents an active power flowing from the $j^{th}$ bus to the $i^{th}$ bus in the transmission network, $Q_{ij}$ represents a reactive power flowing from the $i^{th}$ bus to the $j^{th}$ bus in the transmission network, $b_{ij}^C$ represents a charging susceptance of the $(ij)^{th}$ branch in the transmission network, $Q_{ji}$ represents a reactive power flowing from the $j^{th}$ bus to the $i^{th}$ bus in the transmission network.

In some embodiments of the present disclosure, the first power input equilibrium constraint is represented as:

$$\sum_{j\in IG_{Ti}}P_j^G-\sum_{j:ji\in IL_T}P_{ij}-\sum_{j:ij\in IL_T}P_{ij}-P_i^D-V_i^2g_i^s=0, \forall\ i\in IB_T$$

$$\sum_{j\in IG_{Ti}}Q_j^G-\sum_{j:ji\in IL_T}Q_{ij}-\sum_{j:ij\in IL_T}Q_{ij}-Q_i^D+V_i^2b_i^s=0, \forall\ i\in IB_T$$

where $IG_{Ti}$ represents a set of indexes of generators connected to the $i^{th}$ bus in the transmission network, $P_j^G$ represents an active power output of a $j^{th}$ generator, $P_i^D$ represents an active load of the $i^{th}$ bus in the transmission network, $g_i^s$ represents a parallel conductance of the $i^{th}$ bus in the transmission network, $IB_T$ represents a set of indexes of buses in the transmission network, $Q_j^G$ represents a reactive power output of the $j^{th}$ generator, $Q_i^D$ represents a reactive load of the $i^{th}$ bus in the transmission network, $b_i^s$ represents a parallel susceptance of the $i^{th}$ bus in the transmission network.

In some embodiments of the present disclosure, the first voltage limit constraint is represented as:

$$\underline{V_i}\leq V_i\leq\overline{V_i}, \forall i\in IB_T$$

where $\underline{V_i}$ represents a lower limit of the voltage magnitude of the $i^{th}$ bus in the transmission network, and $\overline{V_i}$ represents an upper limit of the voltage magnitude of the $i^{th}$ bus in the transmission network.

In some embodiments of the present disclosure, the first power output constraint is represented as:

$$\underline{P_i^G}\leq P_i^G\leq\overline{P_i^G}, \underline{Q_i^G}\leq Q_i^G\leq\overline{Q_i^G}, \forall i\in IG_T$$

where $IG_T$ represents a set of indexes of generators in the transmission network, $\underline{P_i^G}$ represents a lower limit of an active power of an $i^{th}$ generator, and $\overline{P_i^G}$ represents an upper limit of the active power of the $i^{th}$ generator, $\underline{Q_i^G}$ represents a lower limit of a reactive power of an $i^{th}$ generator, and $\overline{Q_i^G}$ represents an upper limit of the reactive power of the $i^{th}$ generator.

In some embodiments of the present disclosure, the first line capacity constraint is represented as:

$$P_{ij}^2+Q_{ij}^2\leq\overline{S_{ij}}^2, P_{ji}^2+Q_{ji}^2\leq\overline{S_{ij}}^2, \forall ij\in IL_T$$

where $\overline{S_{ij}}$ represents an apparent power capacity of the $(ij)^{th}$ branch in the transmission network.

In some embodiments of the present disclosure, the plurality of distribution network constraints comprise a second power flow constraint, a second power input equilibrium constraint, a voltage drop constraint, a second voltage limit constraint, a second power output constraint, and a second line capacity constraint.

In some embodiments of the present disclosure, the second power flow constraint is represented as:

$$P_{D_k,ij}^2+Q_{D_k,ij}^2=v_{D_k,i}l_{D_k,ij}, \forall ij\in IL_{D_k}, \forall k\in ID$$

where $IL_{D_k}$ represents a set of indexes of branches in a $k^{th}$ distribution network of the plurality of distribution networks, $ID$ represents a set of indexes of the plurality of distribution networks, $P_{D_k,ij}$ represents an active power flowing from an $i^{th}$ bus to a $j^{th}$ bus in the $k^{th}$ distribution network, $Q_{D_k,ij}$ represents a reactive power flowing from an $i^{th}$ bus to a $j^{th}$ bus in the $k^{th}$ distribution network, $v_{D_k,i}$ represents a square of a voltage magnitude of the $i^{th}$ bus in the $k^{th}$ distribution network, $l_{D_k,ij}$ represents a square of a current magnitude of an $(ij)^{th}$ branch in the $k^{th}$ distribution network.

In some embodiments of the present disclosure, the second power input equilibrium constraint is represented as:

$$\sum_{j\in IG_{D_k,i}}P_{D_k,j}^G+\sum_{j:ji\in IL_{D_k}}(P_{D_k,ji}-l_{D_k,ji}R_{D_k,ji})=\sum_{j:ij\in IL_{D_k}}P_{D_k,ij}+P_{D_k,i}^D,$$

$$\forall\ i\in IB_{D_k}, \forall\ k\in ID$$

$$\sum_{j\in IG_{D_k,i}}Q_{D_k,j}^G+\sum_{j:ji\in IL_{D_k}}(Q_{D_k,ji}-l_{D_k,ji}X_{D_k,ji})=\sum_{j:ij\in IL_{D_k}}Q_{D_k,ij}+Q_{D_k,i}^D,$$

$$\forall\ i\in IB_{D_k}, \forall\ k\in ID$$

where $IG_{D_k,i}$ represents a set of indexes of generators connected to the $i^{th}$ bus in the $k^{th}$ distribution network, $IB_{D_k}$ represents a set of indexes of buses in the $k^{th}$ distribution network, $P_{D_k,j}^G$ represents an active power of a $j^{th}$ generator, $P_{D_k,ji}$ represents an active power flowing from the $j^{th}$ bus to the $i^{th}$ bus in the $k^{th}$ distribution network, $l_{D_k,ji}$ represents a square of a current magnitude of a $(ji)^{th}$ branch in the $k^{th}$ distribution network, $R_{D_k,ji}$ represents a resistance of the $(ji)^{th}$ branch in the $k^{th}$ distribution network, $P_{D_k,i}^D$ represents an active load of the $i^{th}$ bus in the $k^{th}$ distribution network, $Q_{D_k,j}^G$ represents a reactive power of the $j^{th}$ generator, $Q_{D_k,ji}$ represents a reactive power flowing from $j^{th}$ bus to the $i^{th}$ bus in the $k^{th}$ distribution network, $X_{D_k,ji}$ represents a reactance of the $(ji)^{th}$ branch in the $k^{th}$ distribution network and $Q_{D_k,i}^D$ represents a reactive load of the $i^{th}$ bus in the $k^{th}$ distribution network.

In some embodiments of the present disclosure, the voltage drop constraint is represented as:

$$v_{D_k,j}=v_{D_k,i}-2(R_{D_k,ij}P_{D_k,ij}+X_{D_k,ij}Q_{D_k,ij})+(R_{D_k,ij}^2+X_{D_k,ij}^2)l_{D_k,ij}, \forall ij\in IL_{D_k}, \forall k\in ID$$

where $v_{D_k,j}$ represents a square of a voltage magnitude of the $j^{th}$ bus in the $k^{th}$ distribution network, $R_{D_k,ij}$ represents a resistance of the (ij)$^{th}$ branch in the k$^{th}$ distribution network, and $X_{D_k,ij}$ represents a reactance of the (ij)$^{th}$ branch in the k$^{th}$ distribution network.

In some embodiments of the present disclosure, the second voltage limit constraint is represented as:

$$\underline{v_{D_k,i}} \leq v_{D_k,i} \leq \overline{v_{D_k,i}}, \forall i \in IB_{D_k}, \forall k \in ID$$

where $\underline{v_{D_k,i}}$ represents a lower limit of the square of the voltage magnitude of the i$^{th}$ bus in the k$^{th}$ distribution network, and $\overline{v_{D_k,i}}$ represents an upper limit of the square of the voltage magnitude of the i$^{th}$ bus in the k$^{th}$ distribution network.

In some embodiments of the present disclosure, the second power output constraint is represented as:

$$\underline{P_{D_k,i}^G} \leq P_{D_k,i}^G \leq \overline{P_{D_k,i}^G}, \underline{Q_{D_k,i}^G} \leq Q_{D_k,i}^G \leq \overline{Q_{D_k,i}^G}, \forall i \in IG_{D_k}, \forall k \in ID$$

where $IG_{D_k}$ represents a set of indexes of generators in the k$^{th}$ distribution network, $\underline{P_{D_k,i}^G}$ represents a lower limit of the active power of an i$^{th}$ generator, and $\overline{P_{D_k,i}^G}$ represents an upper limit of the active power of the i$^{th}$ generator, $\underline{Q_{D_k,i}^G}$ represents a lower limit of the reactive power of the i$^{th}$ generator, and $\overline{Q_{D_k,i}^G}$ represents an upper limit of the reactive power of the i$^{th}$ generator.

In some embodiments of the present disclosure, the second line capacity constraint is represented as:

$$l_{D_k,ij} \leq \overline{l_{D_k,ij}}, \forall ij \in IL_{D_k}, \forall k \in ID$$

where $\overline{l_{D_k,ij}}$ represents an upper limit of the square of the current magnitude of the (ij)$^{th}$ branch in the k$^{th}$ distribution network.

In some embodiments of the present disclosure, the plurality of transmission-distribution network boundary constraints comprise an active power matching constraint, a reactive power matching constraint, and a voltage magnitude matching constraint.

In some embodiments of the present disclosure, the active power matching constraint is represented as:

$$P_{T \to D_k,i}^G = P_{D_k \leftarrow T,i}^G, \forall k \in ID, \forall i \in D_k^{PCC}$$

where $P_{T \to D_k,i}^G$ represents an active power transmitted from the transmission network to the k$^{th}$ distribution network via an i$^{th}$ boundary bus connected to the k$^{th}$ distribution network, $P_{D_k \leftarrow T,i}^G$ represents an active power absorbed by the k$^{th}$ distribution network from the transmission network via the i$^{th}$ boundary bus connected to the transmission network, $D_k^{PCC}$ represents a set of indexes of boundary buses between the k$^{th}$ distribution network and the transmission bus.

In some embodiments of the present disclosure, the reactive power matching constraint is represented as:

$$Q_{T \to D_k,i}^G = Q_{D_k \leftarrow T,i}^G, \forall k \in ID, \forall i \in D_k^{PCC}$$

where $Q_{T \to D_k,i}^G$ represents a reactive power transmitted from the transmission network to the k$^{th}$ distribution network via the i$^{th}$ boundary bus connected to the k$^{th}$ distribution network, $Q_{D_k \leftarrow T,i}^G$ represents a reactive power absorbed by the k$^{th}$ distribution network from the transmission network via the i$^{th}$ boundary bus connected to the transmission network.

In some embodiments of the present disclosure, the voltage magnitude matching constraint is represented as:

$$(V_{T,D_k,i})^2 = v_{D_k,T,i}, \forall k \in ID, \forall i \in D_k^{PCC}$$

where $V_{T,D_k,i}$ represents a voltage magnitude of the i$^{th}$ boundary bus connected to the k$^{th}$ distribution network, $v_{D_k,T,i}$ represents a square of the voltage magnitude of the i$^{th}$ boundary bus connected to the transmission network.

In some embodiments of the present disclosure, the processor is further configured to:

perform the second order cone relaxation on the second power flow constraint to obtain the relaxed second power flow constraint as follows:

$$P_{D_k,ij}^2 + Q_{D_k,ij}^2 \leq v_{D_k,i} l_{D_k,ij}, \forall ij \in IL_{D_k}, \forall k \in ID$$

rewrite the reactive power-voltage control model to obtain the convex-relaxed reactive power-voltage control model as follows:

$$\min_{x_T} C_T(x_T)$$

satisfying $$F_T(x_T) \leq 0$$

$$F_{D_k}(x_{D_k}) \leq 0, \forall k \in ID$$

$$x_{T_k,B} = x_{D_k,B}, \forall k \in ID$$

where $x_T$ represents a first column vector containing variables $P_{ij}$, $Q_{ij}$, $P_{ji}$, $Q_{ji}$, $P_i^G$, $Q_i^G$, $V_i$, and $\theta_i$ of the transmission network; $x_{D_k}$ represents a second column vector containing variables $P_{D_k,ij}$, $Q_{D_k,ij}$, $P_{D_k,i}^G$, $Q_{D_k,i}^G$, $v_{D_k,i}$ and $l_{D_k,ij}$ of the k$^{th}$ distribution network; $C_T(X_T)$ represents a sum of active powers absorbed by the transmission bus on at least one common connection bus; $F_T(x_T) \leq 0$ represents the plurality of transmission network constraints, $F_{D_k}(x_{D_k}) \leq 0$ represents the plurality of distribution network constraints having the second power flow constraint replaced with the relaxed second power flow constraint, $x_{T_k,B} = x_{D_k,B}$ represents the plurality of transmission-distribution network boundary constraints, $x_{T_k,B}$ represents a third column vector comprising variables $P_{T \to D_k,i}^G$, $Q_{T \to D_k,i}^G$ and $(V_{T,D_k,i})^2$ of boundary buses between the transmission network and the k$^{th}$ distribution network; $x_{D_k,B}$ represents a fourth column vector comprising variables $P_{D_k \leftarrow T,i}^G$, $Q_{D_k \leftarrow T,i}^G$ and $v_{D_k,T,i}$ of boundary buses between the k$^{th}$ distribution network and the transmission network.

In some embodiments of the present disclosure, the processor is further configured to:

rewrite the convex-relaxed reactive power-voltage control model by an augmented Lagrange method into a following formula:

$$L\left(x_T, \{x_{D_k}\}_{k \in ID}, \{y_k\}_{k \in ID}\right) =$$
$$C_T(x_T) + \sum_{k \in ID} \left\{ y_k^T [x_{T_k,B} - x_{D_k,B}] + \frac{\rho}{2} \|x_{T_k,B} - x_{D_k,B}\|_2^2 \right\}$$

where $$\{x_{D_k}\}_{k \in ID}$$

represents a set of variables of the plurality distribution networks, $y_k$ represents a fifth column vector comprising Lagrange multipliers of the plurality of transmission-distribution network boundary constraints corresponding to the k$^{th}$ distribution network, the superscript T represents a transposition of a vector, $\{x_{D_k}\}_{k \in ID}$ represents a set of Lagrange multipliers of the plurality of transmission-distribution network boundary constraints corresponding respectively to the plurality of distribution networks, ρ represents a positive penalty factor, $\|\cdot\|_2^2$ represents a square of 2-Norm of a vector; and obtain the control variables of the transmission network and the control variables of each distribution network by iterative solution method based on an asynchronous distributed algorithm of alternating direction method of multipliers (ADMM).

In some embodiments of the present disclosure, the processor is further configured to:

a) let m=1, $\hat{y}_k^m=0$, η=0.999, $\alpha^m=1$, and $d_k^m=0$, set the positive penalty factor ρ, a time margin $T_{thr}$, an upper limit τ of the number of occurrences and a convergence threshold, and assign an initial value to a variant $\hat{x}_{D_k,B}^1$ of the fourth column vector, where m represents a number of iterative steps, $\hat{y}_k^m$ represents a variant of the fifth column vector in an $m^{th}$ iterative step, η represents a parameter indicating decrement of residual, $\alpha^m$ represents an initial parameter in the $m^{th}$ iterative step, and $d_k^m$ represents a variable indicating a number of occurrences that the $k^{th}$ distribution network is consecutively asynchronous during in $m^{th}$ iterative step;

b) during the $m^{th}$ iterative step, solve the reactive power-voltage control model in a following form to obtain an optimal solution $x_T^{m+1}$:

$$\min_{x_T} C_T(x_T) + \sum_{k \in ID} \left\{ (\hat{y}_k^m)^T [x_{T_k,B} - \hat{x}_{D_k,B}^m] + \frac{\rho}{2} \|x_{T_k,B} - \hat{x}_{D_k,B}^m\|_2^2 \right\}$$

satisfying $$F_T(x_T) \le 0$$

where $\hat{y}_k^m$ represents a variant of the fifth column vector in the $m^{th}$ iterative step, and $x_{D_k,B}^m$ represents a variant of the fourth column vector in the $m^{th}$ iterative step;

c) transmit the third column vector $x_{T_k,B}^{m+1}$ corresponding to the $k^{th}$ distribution network in the optimal solution $x_T^{m+1}$ to the $k^{th}$ distribution network;

d) during the $m^{th}$ iterative step, receive the third column vector $x_{T_k,B}^{m+1}$ from the transmission network by the $k^{th}$ distribution network and solve the reactive power-voltage control model in a following form to obtain an optimal solution $x_{D_k}^{m+1}$:

$$\min_{x_{D_k}} (\hat{y}_k^m)^T [x_{T_k,B}^{m+1} - x_{D_k,B}] + \frac{\rho}{2} \|x_{T_k,B}^{m+1} - x_{D_k,B}\|_2^2$$

satisfying $$F_{D_k}(x_{D_k}) \le 0$$

e) transmit the fourth column vector $x_{D_k,B}^{m+1}$ corresponding to the $k^{th}$ distribution network in the optimal solution $x_{D_k}^{m+1}$ to the transmission network;

f) determine whether the number of occurrences exceeds the upper limit τ for each distribution network;

g) when the number of occurrences does not exceed the upper limit τ for each distribution network, obtain the fourth column vector $x_{D_k,B}^{m+1}$ from each distribution network within the time margin $T_{thr}$ as follows:

$$x_{D_k,B}^{m+1} = \begin{cases} x_{D_k,B}^{m+1}, & \forall k \in H^m \\ x_{D_k,B}^{LV,m}, & \forall k \in (ID - H^m) \end{cases}$$

where, $H^m$ represents a set of indexes of distribution networks from which the fourth column vector is received within the time margin $T_{thr}$; $x_{D_k,B}^{LV,m}$ represents the fourth column vector received from the $k^{th}$ distribution network during the $(m-1)^{th}$ iterative step;

(h) when the number of occurrences exceeds the upper limit τ for any distribution network, $m^{+1}$ obtain the fourth column vector $x_{D_k,B}^{m+1}$ from each distribution network, and if a plurality of fourth column vectors are received from the $k^{th}$ distribution network during the $m^{th}$ iterative step, use the latest received fourth column vector;

(i) update the number of occurrences as follows:

$$d_k^{m+1} = \begin{cases} 0, & \forall k \in H^m \\ d_k^m + 1, & \forall k \in (ID - H^m) \end{cases}$$

where $d_k^{m+1}$ represents the number of occurrences for the $k^{th}$ distribution network after the $m^{th}$ iterative step;

(j) update the Lagrange multiplier corresponding to the $k^{th}$ distribution network as follows:

$$y_k^{m+1} = \hat{y}_k^m + \rho(x_{T_k,B}^{m+1} - x_{D_k,B}^{m+1})$$

where $y_k^{m+1}$ represents the Lagrange multiplier corresponding to the $k^{th}$ distribution network obtained in the $m^{th}$ iterative step;

(k) determine a primal residual and a dual residual after the $m^{th}$ iterative step as follows:

$$p^{m+1} = \|x_{T,B}^{m+1} - x_{D,B}^{m+1}\|_\infty$$

$$d^{m+1} = \|x_{T,B}^{m+1} - x_{T,B}^m\|_\infty$$

where $p^{m+1}$ represents the primal residual of the reactive power-voltage control model after the $m^{th}$ iterative step, $d^{m+1}$ represents the dual residual of the reactive power-voltage control model after the $m^{th}$ iterative step, $x_{T,B}^{m+1}$ represents a set containing all the third column vector $x_{T_k,B}^{m+1}$, $x_{D,B}^{m+1}$ resents a set containing all the fourth column vector $x_{D_k,B}^{m+1}$, $\|\cdot\|_\infty$ represents a ∞-Norm of a vector;

(l) determine whether a convergence condition $$\left\| \begin{matrix} p^{m+1} \\ d^{m+1} \end{matrix} \right\|_\infty < \varepsilon$$

is met, if yes, configure the optimum solution $x_T^{m+1}$ obtained in the $m^{th}$ iterative step as the control variables of the transmission network and configure the optimum solution $x_{D_k}^{m+1}$ obtained in the $m^{th}$ iterative step as the control variables of the k distribution network, and if no, executing step (m);

(m) update a residual parameter as follows:

$$u^{m+1} = \rho^{-1} \|y^{m+1} - \hat{y}^m\|_2^2 + \rho \|x_{D,B}^{m+1} - \hat{x}_{D,B}^m\|_2^2$$

where $u^{m+1}$ represents the residual parameter after the $m^{th}$ iterative step, $y^{m+1}$ represents a set containing all the Lagrange multipliers $y_k^{m+1}$, $\hat{y}^m$ represents a set containing all the variants $\hat{y}_k^m$ of the fifth column vectors, $\hat{x}_{D,B}^m$ represents a set containing all the variants $\hat{x}_{D_k,B}^m$ of the fourth column vectors;

(n) determine whether a condition $u^{m+1} < \eta u^m$ is met, if yes, update the initial parameter, the variant of the fourth column vector, and the variant of the fifth column vector as follows:

$$\alpha^{m+1} = \frac{1 + \sqrt{1 + 4(\alpha^m)^2}}{2}$$

$$\hat{x}_{D_k,B}^{m+1} = x_{D_k,B}^{m+1} + \frac{\alpha^m - 1}{\alpha^{m+1}}(x_{D_k,B}^{m+1} - x_{D_k,B}^m)$$

$$\hat{y}_k^{m+1} = y_k^{m+1} + \frac{\alpha^m - 1}{\alpha^{m+1}}(y_k^{m+1} - y_k^m)$$

where $\alpha^{m+1}$ represents the initial parameter after the $m^{th}$ iterative step;

if no, update the initial parameter, the variant of the fourth column vector, and the variant of the fifth column vector as follows:

$$\alpha^{m+1}=1, u^{m+1}=\eta^{-1}u^m, \hat{x}_{D_k,B}^{m+1}=x_{D_k,B}^{m-1}, \hat{y}_k^{m+1}=y_k^{m-1}$$

(o) transmit the updated variant $\hat{y}_k^{m+1}$ of the fifth column vector to the $k^{th}$ distribution network and executing step (p);

(p) let m=m+1 and return to step (b).

In the following, a non-transitory computer-readable storage medium according to embodiments of the present disclosure will be described in detail.

In the embodiments of the present disclosure, the non-transitory computer-readable storage medium having stored therein instructions that, when executed by a processor of a terminal, causes the terminal to perform a reactive power-voltage control method according to the above embodiments of the present disclosure for running an application program.

Any process or method described in the flowing diagram or other means may be understood as a module, segment or portion including one or more executable instruction codes of the procedures configured to achieve a certain logic function or process, and the preferred embodiments of the present disclosure include other performances, in which the performance may be achieved in other orders instead of the order shown or discussed, such as in an almost simultaneous way or in an opposite order, which should be appreciated by those having ordinary skills in the art to which embodiments of the present disclosure belong.

The logic and/or procedures indicated in the flowing diagram or described in other means herein, such as a constant sequence table of the executable code for performing a logical function, may be implemented in any computer readable storage medium so as to be adopted by the code execution system, the device or the equipment (such a system based on the computer, a system including a processor or other systems fetching codes from the code execution system, the device and the equipment, and executing the codes) or to be combined with the code execution system, the device or the equipment to be used. With respect to the description of the present invention, "the computer readable storage medium" may include any device including, storing, communicating, propagating or transmitting program so as to be used by the code execution system, the device and the equipment or to be combined with the code execution system, the device or the equipment to be used. The computer readable medium includes specific examples (a non-exhaustive list): the connecting portion (electronic device) having one or more arrangements of wire, the portable computer disc cartridge (a magnetic device), the random access memory (RAM), the read only memory (ROM), the electrically programmable read only memory (EPROMM or the flash memory), the optical fiber device and the compact disk read only memory (CDROM). In addition, the computer readable storage medium even may be papers or other proper medium printed with program, as the papers or the proper medium may be optically scanned, then edited, interpreted or treated in other ways if necessary to obtain the program electronically which may be stored in the computer memory.

It should be understood that, each part of the present invention may be implemented by the hardware, software, firmware or the combination thereof. In the above embodiments of the present invention, the plurality of procedures or methods may be implemented by the software or hardware stored in the computer memory and executed by the proper code execution system. For example, if the plurality of procedures or methods is to be implemented by the hardware, like in another embodiment of the present invention, any one of the following known technologies or the combination thereof may be used, such as discrete logic circuits having logic gates for implementing various logic functions upon an application of one or more data signals, application specific integrated circuits having appropriate logic gates, programmable gate arrays (PGA), field programmable gate arrays (FPGA).

It can be understood by those having the ordinary skills in the related art that all or part of the steps in the method of the above embodiments can be implemented by instructing related hardware via programs, the program may be stored in a computer readable storage medium, and the program includes one step or combinations of the steps of the method when the program is executed.

In addition, each functional unit in the present disclosure may be integrated in one progressing module, or each functional unit exists as an independent unit, or two or more functional units may be integrated in one module. The integrated module can be embodied in hardware, or software. If the integrated module is embodied in software and sold or used as an independent product, it can be stored in the computer readable storage medium.

The non-transitory computer-readable storage medium may be, but is not limited to, read-only memories, magnetic disks, or optical disks.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "In the embodiments of the present disclosure," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A reactive power-voltage control method, performed by a power system, comprising:

establishing a reactive power-voltage control model for the power system consisting of a transmission network and a plurality of distribution networks, wherein the plurality of distribution networks are radial in nature, the reactive power-voltage control model comprises an objective function and a plurality of constraints, the objective function is established for minimizing a sum of active power outputs of generators at a slack bus in the transmission network, and the plurality of constraints include a plurality of transmission network constraints, a plurality of distribution network constraints and a plurality of transmission-distribution network boundary constraints;

performing a second order cone relaxation on a non-convex constraint of the plurality of distribution network constraints to obtain a convex-relaxed reactive power-voltage control model;

solving the convex-relaxed reactive power-voltage control model to acquire control variables of the transmission network and control variables of each distribution network; and performing coordinated reactive power-voltage control on the transmission network and each distribution network based on the control variables of the transmission network and the control variables of the distribution network, wherein the objective function is represented as:

$$\min \sum_{i \in G_{PCC}^T} P_i^G$$

where $G_{PCC}^T$ presents a set of indexes of the generators at the slack bus in the transmission network, and $P_i^G$ represents an active power output of an $i^{th}$ generator in $G_{PCC}^T$, wherein the plurality of transmission network constraints comprise a first power flow constraint, a first power input equilibrium constraint, a first voltage limit constraint, a first power output constraint, and a first line capacity constraint;

wherein the first power flow constraint is represented as:

$$P_{ij} = \frac{1}{\tau_{ij}^2} g_{ij}^\varepsilon V_i^2 - \frac{1}{\tau_{ij}} V_i V_j [g_{ij}^\varepsilon \cos(\theta_i - \theta_j - \phi_{ij}) + b_{ij}^\varepsilon \sin(\theta_i - \theta_j - \phi_{ij})],$$

$$\forall ij \in IL_T$$

$$P_{ji} = g_{ij}^\varepsilon V_j^2 - \frac{1}{\tau_{ij}} V_i V_j [g_{ij}^\varepsilon \cos(\theta_j - \theta_i + \phi_{ij}) + b_{ij}^\varepsilon \sin(\theta_j - \theta_i + \phi_{ij})], \forall ij \in IL_T$$

$$Q_{ij} = -\frac{1}{\tau_{ij}^2}\left(b_{ij}^\varepsilon \frac{b_{ij}^C}{2}\right) V_i^2 - \frac{1}{\tau_{ij}} V_i V_j [g_{ij}^\varepsilon \sin(\theta_i - \theta_j - \phi_{ij}) - b_{ij}^\varepsilon \cos(\theta_i - \theta_j - \phi_{ij})],$$

$$\forall ij \in IL_T$$

$$Q_{ji} = -\left(b_{ij}^\varepsilon \frac{b_{ij}^C}{2}\right) V_j^2 - \frac{1}{\tau_{ij}} V_i V_j [g_{ij}^\varepsilon \sin(\theta_j - \theta_i + \phi_{ij}) - b_{ij}^\varepsilon \cos(\theta_j - \theta_i + \phi_{ij})],$$

$$\forall ij \in IL_T$$

where $P_{ij}$ represents an active power flowing from an $i^{th}$ bus to a $j^{th}$ bus in the transmission network, $\tau_{ij}$ represents a transformer ratio of an $(ij)^{th}$ branch in the transmission network, $g_{ij}^\varepsilon$ represents an electric conductance of the $(ij)^{th}$ branch in the transmission network, $V_i$ represents a voltage magnitude of the $i^{th}$ bus in the transmission network, $V_j$ represents a voltage magnitude of the $j^{th}$ bus in the transmission network, $\theta_i$ represents a voltage phase-angle of the $i^{th}$ bus in the transmission network, $\theta_j$ represents a voltage phase-angle of the $j^{th}$ bus in the transmission network, $\phi_{ij}$ represents a transformer phase shifting angle of the $(ij)^{th}$ branch in the transmission network, $b_{ij}^\varepsilon$ represents a susceptance of the $(ij)^{th}$ branch in the transmission network, the $(ij)^{th}$ branch represents a branch from the $i^{th}$ bus to the $j^{th}$ bus, $IL_T$ represents a set of indexes of branches in the transmission network, $P_{ji}$ represents an active power flowing from the $j^{th}$ bus to the $i^{th}$ bus in the transmission network, $Q_{ij}$ represents a reactive power flowing from the $i^{th}$ bus to the $j^{th}$ bus in the transmission network, $b_{ij}^C$ represents a charging susceptance of the $(ij)^{th}$ branch in the transmission network, $Q_{ji}$ represents a reactive power flowing from the $j^{th}$ bus to the $i^{th}$ bus in the transmission network;

wherein the first power input equilibrium constraint is represented as:

$$\sum_{j \in IG_{Ti}} P_j^G - \sum_{j: ji \in IL_T} P_{ij} - \sum_{j: ij \in IL_T} P_{ij} - P_i^D - V_i^2 g_i^s = 0, \forall i \in IB_T$$

$$\sum_{j \in IG_{Ti}} Q_j^G - \sum_{j: ji \in IL_T} Q_{ij} - \sum_{j: ij \in IL_T} Q_{ij} - Q_i^D + V_i^2 b_i^s = 0, \forall i \in IB_T$$

where $IG_{Ti}$ represents a set of indexes of generators connected to the $i^{th}$ bus in the transmission network, $P_j^G$ represents an active power output of a $j^{th}$ generator, $P_i^D$ represents an active load of the $i^{th}$ bus in the transmission network, $g_i^S$ represents a parallel conductance of the $i^{th}$ bus in the transmission network, $IB_T$ represents a set of indexes of buses in the transmission network, $Q_j^G$ represents a reactive power output of the $j^{th}$ generator, $Q_i^D$ represents a reactive load of the $i^{th}$ bus in the transmission network, $b_i^S$ represents a parallel susceptance of the $i^{th}$ bus in the transmission network;

wherein the first voltage limit constraint is represented as:

$$\underline{V_i} \leq V_i \leq \overline{V_i}, \forall i \in IB_T$$

where $\underline{V_i}$ represents a lower limit of the voltage magnitude of the $i^{th}$ bus in the transmission network, and $\overline{V_i}$ represents an upper limit of the voltage magnitude of the $i^{th}$ bus in the transmission network;

wherein the first power output constraint is represented as:

$$\underline{P_i^G} \leq P_i^G \leq \overline{P_i^G}, \underline{Q_i^G} \leq Q_i^G \leq \overline{Q_i^G}, \forall i \in IG_T$$

where $IG_T$ represents a set of indexes of generators in the transmission network, $\underline{P_i^G}$ represents a lower limit of an active power of an $i^{th}$ generator, and $\overline{P_i^G}$ represents an upper limit of the active power of the $i^{th}$ generator, $\underline{Q_i^G}$ represents a lower limit of a reactive power of an $i^{th}$ generator, and $\overline{Q_i^G}$ represents an upper limit of the reactive power of the $i^{th}$ generator;

wherein the first line capacity constraint is represented as:

$$P_{ij}^2 + Q_{ij}^2 \leq \overline{S_{ij}}^2, P_{ji}^2 + Q_{ji}^2 \leq \overline{S_{ij}}^2, \forall ij \in IL_T$$

where $\overline{S_{ij}}$ represents an apparent power capacity of the $(ij)^{th}$ branch in the transmission network.

2. The method of claim 1, wherein the plurality of distribution network constraints comprise a second power flow constraint, a second power input equilibrium constraint, a voltage drop constraint, a second voltage limit constraint, a second power output constraint, and a second line capacity constraint;

wherein the second power flow constraint is represented as:

$$P_{D_k,ij}^2 + Q_{D_k,ij}^2 = v_{D_k,i} l_{D_k,ij}, \forall ij \in IL_{D_k}, \forall k \in ID$$

where $IG_{D_k}$ represents a set of indexes of branches in a $k^{th}$ distribution network of the plurality of distribution networks, ID represents a set of indexes of the plurality of distribution networks, $P_{D_k,ij}$ represents an active power flowing from an $i^{th}$ bus to a $j^{th}$ bus in the $k^{th}$ distribution network, $Q_{D_k,ij}$ represents a reactive power flowing from an $i^{th}$ bus to a $j^{th}$ bus in the $k^{th}$ distribution network, $V_{D_k,i}$ represents a square of a voltage magnitude of the $i^{th}$ bus in the $k^{th}$ distribution network, $l_{D_k,ij}$ represents a square of a current magnitude of an $(ij)^{th}$ branch in the $k^{th}$ distribution network;

wherein the second power input equilibrium constraint is represented as:

$$\sum_{j \in IG_{D_k,i}} P^G_{D_k,j} + \sum_{j: ji \in IL_{D_k}} (P_{D_k,ji} - l_{D_k,ji} R_{D_k,ji}) = \sum_{j: ij \in IL_{D_k}} P_{D_k,ij} + P^D_{D_k,i},$$

$$\forall i \in IB_{D_k}, \forall k \in ID$$

$$\sum_{j \in IG_{D_k,i}} Q^G_{D_k,j} + \sum_{j: ji \in IL_{D_k}} (Q_{D_k,ji} - l_{D_k,ji} X_{D_k,ji}) = \sum_{j: ij \in IL_{D_k}} Q_{D_k,ij} + Q^D_{D_k,i},$$

$$\forall i \in IB_{D_k}, \forall k \in ID$$

where $IG_{D_k,i}$ represents a set of indexes of generators connected to the $i^{th}$ bus in the $k^{th}$ distribution network, $IB_{D_k}$ represents a set of indexes of buses in the $k^{th}$ distribution network, $P_{D_k,j}^G$ represents an active power of a $j^{th}$ generator, $P_{D_k,ji}$ epresents an active power flowing from the $j^{th}$ bus to the $i^{th}$ bus in the $k^{th}$ distribution network, $l_{D_k,ji}$ represents a square of a current magnitude of a $(ji)^{th}$ branch in the $k^{th}$ distribution network, $R_{D_k,ji}$ represents a resistance of the $(ji)^{th}$ branch in the $k^{th}$ distribution network, $P_{D_k,i}^D$ represents an active load of the $i^{th}$ bus in the $k^{th}$ distribution network, $Q_{D_k,j}^G$ represents a reactive power of the $j^{th}$ generator, $Q_{D_k,ji}$ represents a reactive power flowing from $j^{th}$ bus to the $i^{th}$ bus in the $k^{th}$ distribution network, $X_{D_k,ji}$ represents a reactance of the $(ji)^{th}$ branch in the $k^{th}$ distribution network and $Q_{D_k,i}^D$ represents a reactive load of the $i^{th}$ bus in the $k^{th}$ distribution network;

wherein the voltage drop constraint is represented as:

$$v_{D_k,j} = v_{D_k,i} - 2(R_{D_k,ij} P_{D_k,ij} + X_{D_k,ij} Q_{D_k,ij}) + (R_{D_k,ij}^2 + X_{D_k,ij}^2) l_{D_k,ij}, \forall ij \in IL_{D_k}, \forall k \in ID$$

where $v_{D_k,j}$ represents a square of a voltage magnitude of the $j^{th}$ bus in the $k^{th}$ distribution network, $R_{D_k,ij}$ represents a resistance of the $(ij)^{th}$ branch in the $k^{th}$ distribution network, and $X_{D_k,ij}$ represents a reactance of the $(ij)^{th}$ branch in the $k^{th}$ distribution network;

wherein the second voltage limit constraint is represented as:

$$\underline{v_{D_k,i}} \le v_{D_k,i} \le \overline{v_{D_k,i}}, \forall i \in IB_{D_k}, \forall k \in ID$$

where $\underline{v_{D_k,i}}$ represents a lower limit of the square of the voltage magnitude of the $i^{th}$ bus in the $k^{th}$ distribution network, and $\overline{v_{D_k,i}}$ represents an upper limit of the square of the voltage magnitude of the $i^{th}$ bus in the $k^{th}$ distribution network;

wherein the second power output constraint is represented as:

$$\underline{P_{D_k,i}^G} \le P_{D_k,i}^G \le \overline{P_{D_k,i}^G}, \underline{Q_{D_k,i}^G} \le Q_{D_k,i}^G \le \overline{Q_{D_k,i}^G}, \forall i \in IG_{D_k}, \forall k \in ID$$

where $IG_{D_k}$ represents a set of indexes of generators in the $k^{th}$ distribution network, $\underline{P_{D_k,i}^G}$ represents a lower limit of the active power of an $i^{th}$ generator, and $\overline{P_{D_k,i}^G}$ represents an upper limit of the active power of the $i^{th}$ generator, $\underline{Q_{D_k,i}^G}$ represents a lower limit of the reactive power of the $i^{th}$ generator, and $\overline{Q_{D_k,i}^G}$ represents an upper limit of the reactive power of the $i^{th}$ generator;

wherein the second line capacity constraint is represented as:

$$l_{D_k,ij} \le \overline{l_{D_k,ij}}, \forall ij \in IL_{D_k}, \forall k \in ID$$

where $\overline{l_{D_k,ij}}$ represents an upper limit of the square of the current magnitude of the $(ij)^{th}$ branch in the $k^{th}$ distribution network.

3. The method of claim 2, wherein the plurality of transmission-distribution network boundary constraints comprise an active power matching constraint, a reactive power matching constraint, and a voltage magnitude matching constraint;

wherein the active power matching constraint is represented as:

$$P_{T \to D_k,i}^G = P_{D_k \leftarrow T,i}^G, \forall k \in ID, \forall i \in D_k^{PCC}$$

where $D_k^{PCC}$ represents a set of indexes of boundary buses between the $k^{th}$ distribution network and the transmission network, $P_{T \to D_k,i}^G$ represents an active power transmitted from the transmission network to the $k^{th}$ distribution network via an $i^{th}$ boundary bus, $P_{D_k \leftarrow T,i}^G$ represents an active power absorbed by the $k^{th}$ distribution network from the transmission network via the $i^{th}$ boundary bus;

wherein the reactive power matching constraint is represented as:

$$Q_{T \to D_k,i}^G = Q_{D_k \leftarrow T,i}^G, \forall k \in ID, \forall i \in D_k^{PCC}$$

where $Q_{T \to D_k,i}^G$ represents a reactive power transmitted from the transmission network to the $k^{th}$ distribution network via the $i^{th}$ boundary bus, $Q_{D_k \leftarrow T,i}^G$ represents a reactive power absorbed by the $k^{th}$ distribution network from the transmission network via the $i^{th}$ boundary bus;

wherein the voltage magnitude matching constraint is represented as:

$$(V_{T,D_k,i})^2 = v_{D_k,T,i}, \forall k \in ID, \forall i \in D_k^{PCC}$$

where $V_{T,D_k,i}$ represents a voltage magnitude of the $i^{th}$ boundary bus, $v_{D_k,T,i}$ represents a square of the voltage magnitude of the $i^{th}$ boundary bus.

4. The method of claim 3, wherein the performing the second order cone relaxation on the non-convex constraint of the plurality of distribution network constraints to obtain the convex-relaxed reactive power-voltage control model comprises:

performing the second order cone relaxation on the second power flow constraint to obtain a relaxed second power flow constraint as follows:

$$P_{D_k,ij}^2 + Q_{D_k,ij}^2 \le v_{D_k,ij} l_{D_k,ij}, \forall ij \in IL_{D_k}, \forall k \in ID$$

rewriting the reactive power-voltage control model based on the relaxed second power flow constraint to obtain the convex-relaxed reactive power-voltage control model as follows:

$$\min_{C_T} C_T(x_T)$$

satisfying $$F_T(x_T) \le 0$$

$$F_{D_k}(x_{D_k}) \le 0, \forall k \in ID$$

-continued $$x_{T_k,B} = x_{D_k,B}, \forall k \in ID$$

where $x_T$ represents a first column vector comprising variables $P_{ij}$, $Q_{ij}$, $P_{ji}$, $Q_{ji}$, $P_i^G$, $Q_i^G$, $V_i$, and $\theta_i$ of the transmission network; $x_{D_k}$ represents a second column vector comprising variables $P_{D_k,ij}$, $Q_{D_k,ij}$, $P_{D_k,i}^G$, $Q_{D_k,i}^G$, $v_{D_k,i}$ and $l_{D_k,ij}$ of the $k^{th}$ distribution network; $C_T(X_T)$ represents a sum of active powers absorbed by the transmission bus on at least one common connection bus; $F_T(x_T) \leq 0$ represents the plurality of transmission network constraints, $F_{D_k}(x_{D_k}) \leq 0$ represents the plurality of distribution network constraints having the second power flow constraint replaced with the relaxed second power flow constraint, $x_{T_k,B}$ represents a third column vector containing variables $P_{T \to D_k,i}^G$, $Q_{T \to D_k,i}^G$ and $(V_{T,D_k,i})^2$ of boundary buses between the transmission network and the $k^{th}$ distribution network; $x_{D_k,B}$ represents a fourth column vector containing variables $P_{D_k \leftarrow T,i}^G$, $Q_{D_k \leftarrow T,i}^G$ and $v_{D_k,T,i}$ of boundary buses.

5. The method of claim 4, wherein the solving the convex-relaxed reactive power-voltage control model to acquire control variables of the transmission network and control variables of each distribution network comprises:
rewriting the convex-relaxed reactive power-voltage control model by an augmented Lagrange method as follows:

$$L(x_T, \{x_{D_k}\}_{k \in ID}, \{y_k\}_{k \in ID}) = C_T(x_T) + \sum_{k \in ID} \left\{ y_k^T [x_{T_k,B} - x_{D_k,B}] + \frac{\rho}{2} \|x_{T_k,B} - x_{D_k,B}\|_2^2 \right\}$$

where $$\{x_{D_k}\}_{k \in ID}$$

represents a set of variables of all the plurality distribution networks, $y_k$ represents a fifth column vector comprising Lagrange multipliers of the plurality of transmission-distribution network boundary constraints corresponding to the $k^{th}$ distribution network, the superscript T represents a transposition of a vector, $\{y_k\}_{k \in ID}$ represents a set of Lagrange multipliers of the plurality of transmission-distribution network boundary constraints corresponding respectively to the plurality of distribution networks, $\rho$ represents a positive penalty factor, $\|\cdot\|_2^2$ represents a square of 2-Norm of a vector; and obtaining the control variables of the transmission network and the control variables of each distribution network by an iterative solution method based on an asynchronous distributed algorithm of alternating direction method of multipliers (ADMM).

6. The method of claim 5, wherein the obtaining the control variables of the transmission network and the control variables of each distribution network by iterative solution method based on the asynchronous distributed algorithm of ADMM comprises:
a) letting m=1, $\hat{y}_k^m=0$, $\eta=0.999$, $\alpha^m=1$, and $d_k^m=0$, setting a residual parameter $u^m$, the positive penalty factor $\rho$, a time margin $T_{thr}$, an upper limit $\tau$ of the number of occurrences that the $k^{th}$ distribution network encounters consecutive asynchronism and a convergence threshold, and assigning an initial value of $\hat{x}_{D_k,B}^1$ which represents a variant of the fourth column vector in the first iterative step, where m represents a number of iterative steps, $\hat{y}_k^m$ represents a variant of the fifth column vector in an $m^{th}$ iterative step, $\eta$ represents a parameter indicating decrement of residual, $\alpha^m$ represents an initial parameter in the $m^{th}$ iterative step, and $d_k^m$ represents a variable indicating the number of occurrences that the $k^{th}$ distribution network encounters consecutive asynchronism during the $m^{th}$ iterative step, $u^m$ represents the residual parameter in the $m^{th}$ iterative step;

b) during the $m^{th}$ iterative step, solving by a control center of the transmission network the reactive power-voltage control model in a following form to obtain an optimal solution $X_T^{m+1}$:

$$\min_{x_T} C_T(x_T) + \sum_{k \in ID} \left\{ (\hat{y}_k^m)^T [x_{T_k,B} - \hat{x}_{D_k,B}^m] + \frac{\rho}{2} \|x_{T_k,B} - \hat{x}_{D_k,B}^m\|_2^2 \right\}$$

satisfying $$F_T(x_T) \leq 0$$

where $\hat{y}_k^m$ represents a variant of the fifth column vector in the $m^{th}$ iterative step, and $\hat{x}_{D_k,B}^m$ represents a variant of the fourth column vector in the $m^{th}$ iterative step;

c) transmitting by the control center of the transmission network the third column vector $x_{T_k,B}^{m+1}$ corresponding to the $k^{th}$ distribution network in the optimal solution $x_T^{m+1}$ to the $k^{th}$ distribution network;

d) during the $m^{th}$ iterative step, receiving the third column vector $x_{T_k,B}^{m+1}$ from the transmission network by the $k^{th}$ distribution network and solving the reactive power-voltage control model in a following form to obtain an optimal solution $x_{D_k}^{m+1}$:

$$\min_{x_{D_k}} (\hat{y}_k^m)^T [x_{T_k,B}^{m+1} - x_{D_k,B}] + \frac{\rho}{2} \|x_{T_k,B}^{m+1} - x_{D_k,B}\|_2^2$$

satisfying $$F_{D_k}(x_{D_k}) \leq 0$$

e) transmitting by a control center of the $k^{th}$ distribution network the fourth column vector $x_{D_k,B}^{m+1}$ in the optimal solution $x_{D_k}^{m+1}$ the transmission network;

f) for each distribution network, determining by the control center of the transmission network whether the number of occurrences exceeds the upper limit $\tau$;

g) when the number of occurrences does not exceed the upper limit $\tau$ for each distribution network, obtaining by the control center of the transmission network the fourth column vector $x_{D_k,B}^{m+1}$ from each distribution network within the time margin $T_{thr}$ which is counted from the time when the control center of the transmission network transmits the third column vector to the respective distribution network as follows:

$$x_{D_k,B}^{m+1} = \begin{cases} x_{D_k,B}^{m+1}, \forall k \in H^m \\ x_{D_k,N}^{LV,m}, \forall k \in (ID - H^m) \end{cases}$$

where, $H^m$ represents a set of indexes of distribution networks from which the fourth column vector is received within the time margin $T_{thr}$; $x_{D_k,B}^{LV,m}$ represents the fourth column vector received from the $k^{th}$ distribution network during the $(m-1)^{th}$ iterative step;

(h) when the number of occurrences exceeds the upper limit $\tau$ for any distribution network, obtaining by the control center of the transmission network the fourth column vector $x_{D_k,B}^{m+1}$ from each distribution network, and if a plurality of fourth column vectors are received from the $k^{th}$ distribution network during the $m^{th}$ iterative step, using the latest received fourth column vector;

(i) updating the number of occurrences as follows:

$$d_k^{m+1} = \begin{cases} 0, & \forall k \in H^m \\ d_k^m + 1, & \forall k \in (ID - H^m) \end{cases}$$

where $d_k^{m+1}$ represents the number of occurrences for the $k^{th}$ distribution network after the $m^{th}$ iterative step;

(j) updating by the control center of the transmission network the Lagrange multiplier corresponding to the $k^{th}$ distribution network as follows:

$$y_k^{m+1} = \hat{y}_k^m + \rho(x_{T_k,B}^{m+1} - x_{D_k,B}^{m+1})$$

where $y_k^{m+1}$ represents the Lagrange multiplier corresponding to the $k^{th}$ distribution network obtained in the $m^{th}$ iterative step;

(k) determining by the control center of the transmission network a primal residual and a dual residual after the $m^{th}$ iterative step as follows:

$$p^{m+1} = \|x_{T,B}^{m+1} - x_{D,B}^{m+1}\|_\infty$$

$$d^{m+1} = \|x_{T,B}^{m+1} - x_{T,B}^{m}\|_\infty$$

where $p^{m+1}$ represents the primal residual of the reactive power-voltage control model after the $m^{th}$ iterative step, $d^{m+1}$ represents the dual residual of the reactive power-voltage control model after the $m^{th}$ iterative step, $x_{T,B}^{m+1}$ represents a set containing all the third column vector $x_{T_k,B}^{m+1}$, $x_{D,B}^{m+1}$ represents a set containing all the fourth column vector $x_{D_k,B}^{m+1}$, $\|\cdot\|_\infty$ represents a $\infty$-Norm of a vector;

(l) determining by the control center of the transmission network whether a convergence condition $$\left\| \begin{matrix} p^{m+1} \\ d^{m+1} \end{matrix} \right\|_\infty < \varepsilon$$

is met, if yes, configuring the optimum solution $x_T^{m+1}$ obtained in the $m^{th}$ iterative step as the control variables of the transmission network and configuring the optimum solution $x_{D_k}^{m+1}$ obtained in the $m^{th}$ iterative step as the control variables of the k distribution network; if no, executing step (m);

(m) updating the residual parameter as follows:

$$u^{m+1} = \rho^{-1}\|y^{m+1} - \hat{y}^m\|_2^2 + \rho\|x_{D,B}^{m+1} - \hat{x}_{D,B}^m\|_2^2$$

where $u^{m+1}$ represents the residual parameter after the $m^{th}$ iterative step, $y^{m+1}$ represents a set containing all the Lagrange multipliers $y_k^{m+1}$, $\hat{y}^m$ represents a set containing all the variants $\hat{y}_k^m$ of the fifth column vectors, $\hat{x}_{D,B}^m$ represents a set containing all the variants $\hat{x}_{D_k,B}^m$ of the fourth column vectors;

(n) determining whether a condition $u^{m+1} < \eta u^m$ is met, if yes, updating the initial parameter, the variant of the fourth column vector, and the variant of the fifth column vector as follows:

$$\alpha^{m+1} = \frac{1 + \sqrt{1 + 4(\alpha^m)^2}}{2}$$

$$\hat{x}_{D_k,B}^{m+1} = x_{D_k,B}^{m+1} + \frac{\alpha^m - 1}{\alpha^{m+1}}(x_{D_k,B}^{m+1} - x_{D_k,B}^m)$$

$$\hat{y}_k^{m+1} = y_k^{m+1} + \frac{\alpha^m - 1}{\alpha^{m+1}}(y_k^{m+1} - y_k^m)$$

where $\alpha^{m+1}$ represents the initial parameter after the $m^{th}$ iterative step;

if no, updating the initial parameter, the variant of the fourth column vector, and the variant of the fifth column vector as follows:

$$\alpha^{m+1}=1, u^{m+1}=\eta^{-1}u^m, \hat{x}_{D_k,B}^{m+1}=x_{D_k,B}^{m-1}, \hat{y}_k^{m+1}=y_k^{m-1}$$

(o) transmitting the updated variant $\hat{y}_k^{m+1}$ of the fifth column vector to the $k^{th}$ distribution network and executing step (p);

(p) letting m=m+1 and returning to step (b).

7. A reactive power-voltage control apparatus, comprising:
a processor;
a memory configured to store an instruction executable by the processor;
wherein the processor is configured to:
establish a reactive power-voltage control model for a power system consisting of a transmission network and a plurality of distribution networks, wherein the plurality of distribution networks are radial in nature, the reactive power-voltage control model comprises an objective function and a plurality of constraints, the objective function is established for minimizing a sum of active power outputs of generators at a slack bus in the transmission network, and the plurality of constraints include a plurality of transmission network constraints, a plurality of distribution network constraints and a plurality of transmission-distribution network boundary constraints;
perform a second order cone relaxation on a non-convex constraint of the plurality of distribution network constraints to obtain a convex-relaxed reactive power-voltage control model;
solve the convex-relaxed reactive power-voltage control model to acquire control variables of the transmission network and control variables of each distribution network; and
performing coordinated reactive power-voltage control on the transmission network and each distribution network based on the control variables of the transmission network and the control variables of the distribution network,
wherein the objective function is represented as:

$$\min \sum_{i \in G_{PCC}^T} P_i^G$$

where $G_{PCC}^T$ represents a set of indexes of the generators at the slack bus in the transmission network, and $P_i^G$ represents an $i^{th}$ generator of the generators at the slack bus in the transmission network, wherein the plurality of transmission network constraints comprise a first power flow constraint, a first power input equilibrium constraint, a first voltage limit constraint, a first power output constraint, and a first line capacity constraint;

wherein the first power flow constraint is represented as:

$$P_{ij} = \frac{1}{\tau_{ij}^2} g_{ij}^\varepsilon V_i^2 - \frac{1}{\tau_{ij}} V_i V_j [g_{ij}^\varepsilon \cos(\theta_i - \theta_j - \phi_{ij}) + b_{ij}^\varepsilon \sin(\theta_i - \theta_j - \phi_{ij})],$$

$$\forall\, ij \in IL_T$$

$$P_{ji} = g_{ij}^\varepsilon V_j^2 - \frac{1}{\tau_{ij}} V_i V_j [g_{ij}^\varepsilon \cos(\theta_j - \theta_i + \phi_{ij}) + b_{ij}^\varepsilon \sin(\theta_j - \theta_i + \phi_{ij})], \forall\, ij \in IL_T$$

$$Q_{ij} = -\frac{1}{\tau_{ij}^2}\left(b_{ij}^\varepsilon + \frac{b_{ij}^C}{2}\right)V_i^2 -$$

$$\frac{1}{\tau_{ij}} V_i V_j [g_{ij}^\varepsilon \sin(\theta_i - \theta_j - \phi_{ij}) - b_{ij}^\varepsilon \cos(\theta_i - \theta_j - \phi_{ij})], \forall\, ij \in IL_T$$

$$Q_{ji} = -\left(b_{ij}^\varepsilon + \frac{b_{ij}^C}{2}\right)V_j^2 - \frac{1}{\tau_{ij}} V_i V_j [g_{ij}^\varepsilon \sin(\theta_j - \theta_i + \phi_{ij}) - b_{ij}^\varepsilon \cos(\theta_j - \theta_i + \phi_{ij})],$$

$$\forall\, ij \in IL_T$$

where $P_{ij}$ represents an active power flowing from an $i^{th}$ bus to a $j^{th}$ bus in the transmission network, $\tau_{ij}$ represents a transformer ratio of an $(ij)^{th}$ branch in the transmission network, $g_{ij}^\varepsilon$ represents an electric conductance of the $(ij)^{th}$ branch in the transmission network, $V_i$ represents a voltage magnitude of the $i^{th}$ bus in the transmission network, $V_j$ represents a voltage magnitude of the $j^{th}$ bus in the transmission network, $\theta_i$ represents a voltage phase-angle of the $i^{th}$ bus in the transmission network, $\theta_j$ represents a voltage phase-angle of the $j^{th}$ bus in the transmission network, $\phi_{ij}$ represents a transformer phase shifting angle of the $(ij)^{th}$ branch in the transmission network, $b_{ij}^\varepsilon$ represents a susceptance of the $(ij)^{th}$ branch in the transmission network, the $(ij)^{th}$ branch represents a branch from the $i^{th}$ bus to the $j^{th}$ bus, $IL_T$ represents a set of indexes of branches in the transmission network, $P_{ji}$ represents an active power flowing from the $j^{th}$ bus to the $i^{th}$ bus in the transmission network, $Q_{ij}$ represents a reactive power flowing from the $i^{th}$ bus to the $j^{th}$ bus in the transmission network, $b_{ij}^C$ represents a charging susceptance of the $(ij)^{th}$ branch in the transmission network, $Q_{ji}$ represents a reactive power flowing from the $j^{th}$ bus to the $i^{th}$ bus in the transmission network;

wherein the first power input equilibrium constraint is represented as:

$$\sum_{j \in IG_{T,i}} P_j^G - \sum_{j: ji \in IL_T} P_{ji} - \sum_{j: ij \in IL_T} P_{ij} - P_i^D - V_i^2 g_i^s = 0, \forall\, i \in IB_T$$

$$\sum_{j \in IG_{T,i}} Q_j^G - \sum_{j: ji \in IL_T} Q_{ji} - \sum_{j: ij \in IL_T} Q_{ij} - Q_i^D + V_i^2 b_i^s = 0, \forall\, i \in IB_T$$

where $IG_{T,i}$ represents a set of indexes of generators connected to the $i^{th}$ bus in the transmission network, $P_j^G$ represents an active power output of a $j^{th}$ generator, $P_i^D$ represents an active load of the $i^{th}$ bus in the transmission network, $g_i^S$ represents a parallel conductance of the $i^{th}$ bus in the transmission network, $IB_T$ represents a set of indexes of buses in the transmission network, $Q_j^G$ represents a reactive power output of the $j^{th}$ generator, $Q_i^D$ represents a reactive load of the $i^{th}$ bus in the transmission network, $b_i^S$ represents a parallel susceptance of the $i^{th}$ bus in the transmission network;

wherein the first voltage limit constraint is represented as:

$$\underline{V_i} \leq V_i \leq \overline{V_i}, \forall\, i \in IB_T$$

where $\underline{V_i}$ represents a lower limit of the voltage magnitude of the $i^{th}$ bus in the transmission network, and $\overline{V_i}$ represents an upper limit of the voltage magnitude of the $i^{th}$ bus in the transmission network;

wherein the first power output constraint is represented as:

$$\underline{P_i^G} \leq P_i^G \leq \overline{P_i^G}, \underline{Q_i^G} \leq Q_i^G \leq \overline{Q_i^G}, \forall\, i \in IG_T$$

where $IG_T$ represents a set of indexes of generators in the transmission network, $\underline{P_i^G}$ represents a lower limit of an active power of an $i^{th}$ generator, and $\overline{P_i^G}$ represents an upper limit of the active power of the $i^{th}$ generator, $\underline{Q_i^G}$ represents a lower limit of a reactive power of an $i^{th}$ generator, and $\overline{Q_i^G}$ represents an upper limit of the reactive power of the $i^{th}$ generator;

wherein the first line capacity constraint is represented as:

$$P_{ij}^2 + Q_{ij}^2 \leq \overline{S_{ij}}^2, P_{ji}^2 + Q_{ji}^2 \leq \overline{S_{ij}}^2, \forall\, ij \in IL_T$$

where $\overline{S_{ij}}$ represents an apparent power capacity of the $(ij)^{th}$ branch in the transmission network.

8. The apparatus according to claim 7, wherein the plurality of distribution network constraints comprise a second power flow constraint, a second power input equilibrium constraint, a voltage drop constraint, a second voltage limit constraint, a second power output constraint, and a second line capacity constraint;

wherein the second power flow constraint is represented as:

$$P_{D_k,ij}^2 + Q_{D_k,ij}^2 = v_{D_k,i} l_{D_k,ij}, \forall\, ij \in IL_{D_k}, \forall\, k \in ID$$

where $IG_{D_k}$ represents a set of indexes of branches in a $k^{th}$ distribution network of the plurality of distribution networks, $ID$ represents a set of indexes of the plurality of distribution networks, $P_{D_k,ij}$ represents an active power flowing from an $i^{th}$ bus to a $j^{th}$ bus in the $k^{th}$ distribution network, $Q_{D_k,ij}$ represents a reactive power flowing from an $i^{th}$ bus to a $j^{th}$ bus in the $k^{th}$ distribution network, $v_{D_k,i}$ represents a square of a voltage magnitude of the $i^{th}$ bus in the $k^{th}$ distribution network, $l_{D_k,ij}$ represents a square of a current magnitude of an $(ij)^{th}$ branch in the $k^{th}$ distribution network;

wherein the second power input equilibrium constraint is represented as:

$$\sum_{j \in IG_{D_k,i}} P_{D_k,j}^G - \sum_{j: ji \in IL_{D_k}} (P_{D_k,ji} - l_{D_k,ji} R_{D_k,ji}) = \sum_{j: ij \in IL_{D_k}} P_{D_k,ij} + P_{D_k,i}^D,$$

$$\forall\, i \in IB_{D_k}, \forall\, k \in ID$$

$$\sum_{j \in IG_{D_k,i}} Q_{D_k,j}^G + \sum_{j: ji \in IL_{D_k}} (Q_{D_k,ji} - l_{D_k,ji} X_{D_k,ji}) = \sum_{j: ij \in IL_{D_k}} Q_{D_k,ij} + Q_{D_k,i}^D,$$

$$\forall\, i \in IB_{D_k}, \forall\, k \in ID$$

where $IG_{D_k,i}$ represents a set of indexes of generators connected to the $i^{th}$ bus in the $k^{th}$ distribution network, $IB_{D_k}$ represents a set of indexes of buses in the $k^{th}$ distribution network, $P_{D_{k}j}{}^G$ represents an active power of a $j^{th}$ generator, $P_{D_{k}ji}$ epresents an active power flowing from the $j^{th}$ bus to the $i^{th}$ bus in the $k^{th}$ distribution network, $l_{D_{k}ji}$ represents a square of a current magnitude of a $(ji)^{th}$ branch in the $k^{th}$ distribution network, $R_{D_{k}ji}$ represents a resistance of the $(ji)^{th}$ branch in the $k^{th}$ distribution network, $P_{D_{k}i}{}^D$ represents an active load of the $i^{th}$ bus in the $k^{th}$ distribution network, $Q_{D_{k}j}{}^G$ represents a reactive power of the $j^{th}$ generator, $Q_{D_{k}ji}$ represents a reactive power flowing from $j^{th}$ bus to the $i^{th}$ bus in the $k^{th}$ distribution network, $X_{D_{k}ji}$ represents a reactance of the $(ji)^{th}$ branch in the $k^{th}$ distribution network and $Q_{D_{k}i}{}^D$ represents a reactive load of the $i^{th}$ bus in the $k^{th}$ distribution network;

wherein the voltage drop constraint is represented as:

$$v_{D_{k}j} = v_{D_{k}i} - 2(R_{D_{k}ij}P_{D_{k}ij} + X_{D_{k}ij}Q_{D_{k}ij}) + (R_{D_{k}ij}{}^2 + X_{D_{k}ij}{}^2)l_{D_{k}ij}, \forall ij \in IL_{D_{k}}, \forall k \in ID$$

where $v_{D_{k}j}$ represents a square of a voltage magnitude of the $j^{th}$ bus in the $k^{th}$ distribution network, $R_{D_{k}ij}$ represents a resistance of the $(ij)^{th}$ branch in the $k^{th}$ distribution network, and $X_{D_{k}ij}$ represents a reactance of the $(ij)^{th}$ branch in the $k^{th}$ distribution network;

wherein the second voltage limit constraint is represented as:

$$\underline{v_{D_{k}i}} \leq v_{D_{k}i} \leq \overline{v_{D_{k}i}}, \forall i \in IB_{D_{k}}, \forall k \in ID$$

where $\underline{v_{D_{k}i}}$ represents a lower limit of the square of the voltage magnitude of the $i^{th}$ bus in the $k^{th}$ distribution network, and $\overline{v_{D_{k}i}}$ represents an upper limit of the square of the voltage magnitude of the $i^{th}$ bus in the $k^{th}$ distribution network;

wherein the second power output constraint is represented as:

$$\underline{P_{D_{k}i}{}^G} \leq P_{D_{k}i}{}^G \leq \overline{P_{D_{k}i}{}^G}, \underline{Q_{D_{k}i}{}^G} \leq Q_{D_{k}i}{}^G \leq \overline{Q_{D_{k}i}{}^G}, \forall i \in IG_{D_{k}}, \forall k \in ID$$

where $IG_{D_{k}}$ represents a set of indexes of generators in the $k^{th}$ distribution network, $\underline{P_{D_{k}i}{}^G}$ represents a lower limit of the active power of an $i^{th}$ generator, and $\overline{P_{D_{k}i}{}^G}$ represents an upper limit of the active power of the $i^{th}$ generator, $\underline{Q_{D_{k}i}{}^G}$ represents a lower limit of the reactive power of the $i^{th}$ generator, and $\overline{Q_{D_{k}i}{}^G}$ represents an upper limit of the reactive power of the $i^{th}$ generator;

wherein the second line capacity constraint is represented as:

$$l_{D_{k}ij} \leq \overline{l_{D_{k}ij}}, \forall ij \in IL_{D_{k}}, \forall k \in ID$$

where $\overline{l_{D_{k}ij}}$ represents an upper limit of the square of the current magnitude of the $(ij)^{th}$ branch in the $k^{th}$ distribution network.

9. The apparatus according to claim 8, wherein the plurality of transmission-distribution network boundary constraints comprise an active power matching constraint, a reactive power matching constraint, and a voltage magnitude matching constraint;

wherein the active power matching constraint is represented as:

$$P_{T \to D_{k}i}{}^G = P_{D_{k} \leftarrow T,i}{}^G, \forall k \in ID, \forall i \in D_{k}{}^{PCC}$$

where $D_{k}{}^{PCC}$ represents a set of indexes of boundary buses between the $k^{th}$ distribution network and the transmission network, $P_{T \to D_{k}i}{}^G$ represents an active power transmitted from the transmission network to the $k^{th}$ distribution network via an $i^{th}$ boundary bus, $P_{D_{k} \leftarrow T,i}{}^G$ represents an active power absorbed by the $k^{th}$ distribution network from the transmission network via the $i^{th}$ boundary bus;

wherein the reactive power matching constraint is represented as:

$$Q_{T \to D_{k}i}{}^G = Q_{D_{k} \leftarrow T,i}{}^G, \forall k \in ID, \forall i \in D_{k}{}^{PCC}$$

where $Q_{T \to D_{k}i}{}^G$ represents a reactive power transmitted from the transmission network to the $k^{th}$ distribution network via the $i^{th}$ boundary bus, $Q_{D_{k} \leftarrow T,i}{}^G$ represents a reactive power absorbed by the $k^{th}$ distribution network from the transmission network via the $i^{th}$ boundary bus;

wherein the voltage magnitude matching constraint is represented as:

$$(V_{T,D_{k}i})^2 = v_{D_{k},T,i}, \forall k \in ID, \forall i \in D_{k}{}^{PCC}$$

where $V_{T,D_{k}i}$ represents a voltage magnitude of the $i^{th}$ boundary bus, $v_{D_{k},T,i}$ represents a square of the voltage magnitude of the $i^{th}$ boundary bus.

10. The apparatus according to claim 9, wherein the processor is further configured to:

perform the second order cone relaxation on the second power flow constraint to obtain a relaxed second power flow constraint as follows:

$$P_{D_{k}ij}{}^2 + Q_{D_{k}ij}{}^2 \leq v_{D_{k}i}l_{D_{k}ij}, \forall ij \in IL_{D_{k}}, \forall k \in ID$$

rewriting the reactive power-voltage control model based on the relaxed second power flow constraint to obtain the convex-relaxed reactive power-voltage control model as follows:

$$\min_{x_T} C_T(x_T)$$

satisfying $$F_T(x_T) \leq 0$$

$$F_{D_{k}}(x_{D_{k}}) \leq 0, \forall k \in ID$$

$$x_{T_{k},B} = x_{D_{k},B}, \forall k \in ID$$

where $x_T$ represents a first column vector comprising variables $P_{ij}$, $Q_{ij}$, $P_{ji}$, $Q_{ji}$, $P_i{}^G$, $Q_i{}^G$, $V_i$, and $\theta_i$ of the transmission network; $x_{D_{k}}$ represents a second column vector comprising variables $P_{D_{k}ij}$, $Q_{D_{k}ij}$, $P_{D_{k}i}{}^G$, $Q_{D_{k}i}{}^G$, $v_{D_{k}i}$ and $l_{D_{k}ij}$ of the $k^{th}$ distribution network; $C_T(x_T)$ represents a sum of active powers absorbed by the transmission bus on at least one common connection bus; $F_T(x_T) \leq 0$ represents the plurality of transmission network constraints, $F_{D_{k}}(x_{D_{k}}) \leq 0$ represents the plurality of distribution network constraints having the second power flow constraint replaced with the relaxed second power flow constraint, $x_{T_{k},B}$ represents a third column vector containing variables $P_{T \to D_{k}i}{}^G$, $Q_{T \to D_{k}i}{}^G$ and $(V_{T,D_{k}i})^2$ of boundary buses between the transmission network and the $k^{th}$ distribution network; $x_{D_{k},B}$ represents a fourth column vector containing variables $P_{D_{k} \leftarrow T,i}{}^G$, $Q_{D_{k} \leftarrow T,i}{}^G$ and $v_{D_{k},T,i}$ of boundary buses.

11. The apparatus according to claim 10, wherein the processor is further configured to:

rewrite the convex-relaxed reactive power-voltage control model by an augmented Lagrange method into a following formula:

$$L(x_T, \{x_{D_{k}}\}_{k \in ID}, \{y_k\}_{k \in ID}) = C_T(x_T) + \sum_{k \in ID} \left\{ y_k^T [x_{T_{k},B} - x_{D_{k},B}] + \frac{\rho}{2} \|x_{T_{k},B} - x_{D_{k},B}\|_2^2 \right\}$$

where $$\{x_{D_k}\}_{k \in ID}$$

represents a set of variables of all the plurality distribution networks, $y_k$ represents a fifth column vector comprising Lagrange multipliers of the plurality of transmission-distribution network boundary constraints corresponding to the $k^{th}$ distribution network, the superscript T represents a transposition of a vector, $\{y_k\}_{k \in ID}$ represents a set of Lagrange multipliers of the plurality of transmission-distribution network boundary constraints corresponding respectively to the plurality of distribution networks, $\rho$ represents a positive penalty factor, $\|\cdot\|_2^2$ represents a square of 2-Norm of a vector; and obtaining the control variables of the transmission network and the control variables of each distribution network by an iterative solution method based on an asynchronous distributed algorithm of alternating direction method of multipliers (ADMM).

12. The apparatus according to claim 11, wherein the processor is further configured to:

a) letting m=1, $\hat{y}_k^m$=0, $\eta$=0.999, $\alpha^m$=1, and $d_k^m$=0, setting a residual parameter $u^m$, the positive penalty factor $\rho$, a time margin $T_{thr}$, an upper limit $\tau$ of the number of occurrences that the $k^{th}$ distribution network encounters consecutive asynchronism and a convergence threshold, and assigning an initial value of $\hat{x}_{D_k,B}^1$ which represents a variant of the fourth column vector in the first iterative step, where m represents a number of iterative steps, $\hat{y}_k^m$ represents a variant of the fifth column vector in an $m^{th}$ iterative step, $\eta$ represents a parameter indicating decrement of residual, $\alpha^m$ represents an initial parameter in the $m^{th}$ iterative step, and $d_k^m$ represents a variable indicating the number of occurrences that the $k^{th}$ distribution network encounters consecutive asynchronism during the $m^{th}$ iterative step, $u^m$ represents the residual parameter in the $m^{th}$ iterative step;

b) during the $m^{th}$ iterative step, solve by a control center of the transmission network the reactive power-voltage control model in a following form to obtain an optimal solution $x_T^{m+1}$:

$$\min_{x_T} C_T(x_T) + \sum_{k \in ID} \left\{ (\hat{y}_m^k)^T [x_{T_k,B} - \hat{x}_{D_k,B}^m] + \frac{\rho}{2} \|x_{T_k,B} - \hat{x}_{D_k,B}^m\|_2^2 \right\}$$

satisfying $$F_T(x_T) \leq 0$$

where $\hat{y}_k^m$ represents a variant of the fifth column vector in the $m^{th}$ iterative step, and $\hat{x}_{D_k,B}^m$ represents a variant of the fourth column vector in the $m^{th}$ iterative step;

c) transmitting by the control center of the transmission network the third column vector $x_{T_k,B}^{m+1}$ corresponding to the $k^{th}$ distribution network in the optimal solution $x_T^{m+1}$ to the $k^{th}$ distribution network;

d) during the $m^{th}$ iterative step, receiving the third column vector $x_{T_k,B}^{m+1}$ from the transmission network by the $k^{th}$ distribution network and solving the reactive power-voltage control model in a following form to obtain an optimal solution $x_{D_k}^{m+1}$:

$$\min_{x_{D_k}} (\hat{y}_k^m)^T [x_{T_k,B}^{m+1} - x_{D_k,B}] + \frac{\rho}{2} \|x_{T_k,B}^{m+1} - x_{D_k,B}\|_2^2$$

satisfying $$F_{D_k}(x_{D_k}) \leq 0$$

e) transmitting by a control center of the $k^{th}$ distribution network the fourth column vector $x_{D_k,B}^{m+1}$ corresponding to the $k^{th}$ distribution network in the optimal solution $x_{D_k}^{m+1}$ to the transmission network;

f) determine by the control center of the transmission network whether the number of occurrences exceeds the upper limit $\tau$ for each distribution network;

g) when the number of occurrences does not exceed the upper limit $\tau$ for each distribution network, obtaining by the control center of the transmission network the fourth column vector $x_{D_k,B}^{m+1}$ from each distribution network within the time margin $T_{thr}$ which is counted from the time when the control center of the transmission network transmits the third column vector to the respective distribution network as follows:

$$x_{D_k,B}^{m+1} = \begin{cases} x_{D_k,B}^{m+1}, \forall k \in H^m \\ x_{D_k,B}^{LV,m}, \forall k \in (ID - H^m) \end{cases}$$

where, $H^m$ represents a set of indexes of distribution networks from which the fourth column vector is received within the time margin $T_{thr}$; $x_{D_k,B}^{LV,m}$ represents the fourth column vector received from the $k^{th}$ distribution network during the $(m-1)^{th}$ iterative step;

(h) when the number of occurrences exceeds the upper limit $\tau$ for any distribution network, obtaining by the control center of the transmission network the fourth column vector $x_{D_k,B}^{m+1}$ from each distribution network, and if a plurality of fourth column vectors are received from the $k^{th}$ distribution network during the $m^{th}$ iterative step, using the latest received fourth column vector;

(i) update by the control center of the transmission network the number of occurrences as follows:

$$d_k^{m+1} = \begin{cases} 0, & \forall k \in H^m \\ d_k^m + 1, & \forall k \in (ID - H^m) \end{cases}$$

where $d_k^{m+1}$ represents the number of occurrences for the $k^{th}$ distribution network after the $m^{th}$ iterative step;

(j) updating by the control center of the transmission network the Lagrange multiplier corresponding to the $k^{th}$ distribution network as follows:

$$y_k^{m+1} = \hat{y}_k^m + \rho(x_{T_k,B}^{m+1} - x_{D_k,B}^{m+1})$$

where $y_k^{m+1}$ represents the Lagrange multiplier corresponding to the $k^{th}$ distribution network obtained in the $m^{th}$ iterative step;

(k) determining by the control center of the transmission network a primal residual and a dual residual after the $m^{th}$ iterative step as follows:

$$p^{m+1} = \|x_{T,B}^{m+1} - x_{D,B}^{m+1}\|_\infty$$

$$d^{m+1} = \|x_{T,B}^{m+1} - x_{T,B}^m\|_\infty$$

where $p^{m+1}$ represents the primal residual of the reactive power-voltage control model after the $m^{th}$ iterative step, $d^{m+1}$ represents the dual residual of the reactive power-voltage control model after the $m^{th}$ iterative step, $x_{T,B}^{m+1}$ represents a set containing all the third column vector $x_{T_k,B}^{m+1}$, $x_{D,B}^{m+1}$ represents a set containing all the fourth column vector $x_{D_k,B}^{m+1}$, $\|\cdot\|_\infty$ represents a ∞-Norm of a vector;

(l) determining by the control center of the transmission network whether a convergence condition $$\left\| \begin{matrix} p^{m+1} \\ d^{m+1} \end{matrix} \right\|_\infty < \varepsilon$$

is met, if yes, configuring the optimum solution $x_T^{m+1}$ obtained in the $m^{th}$ iterative step as the control variables of the transmission network and configuring the optimum solution $x_{D_k}^{m+1}$ obtained in the $m^{th}$ iterative step as the control variables of the k distribution network; if no, executing step (m);

(m) updating the residual parameter as follows:

$$u^{m+1} = \rho^{-1}\|y^{m+1} - \hat{y}^m\|_2^2 + \rho \|x_{D,B}^{m+1} - \hat{x}_{D,B}^m\|_2^2$$

where $u^{m+1}$ represents the residual parameter after the $m^{th}$ iterative step, $y^{m+1}$ represents a set containing all the Lagrange multipliers $y_k^{m+1}$, $\hat{y}^m$ represents a set containing all the variants $\hat{y}_k^m$ of the fifth column vectors, $\hat{x}_{D,B}^m$ represents a set containing all the variants $\hat{x}_{D_k,B}^m$ of the fourth column vectors;

(n) determining whether a condition $u^{m+1} < \eta u^m$ is met, if yes, updating the initial parameter, the variant of the fourth column vector, and the variant of the fifth column vector as follows:

$$\alpha^{m+1} = \frac{1 + \sqrt{1 + 4(\alpha^m)^2}}{2}$$

$$\hat{x}_{D_k,B}^{m+1} = x_{D_k,B}^{m+1} + \frac{\alpha^m - 1}{\alpha^{m+1}}(x_{D_k,B}^{m+1} - x_{D_k,B}^m)$$

$$\hat{y}_k^{m+1} = y_k^{m+1} + \frac{\alpha^m - 1}{\alpha^{m+1}}(y_k^{m+1} - y_k^m)$$

where $\alpha^{m+1}$ represents the initial parameter after the $m^{th}$ iterative step;

if no, updating the initial parameter, the variant of the fourth column vector, and the variant of the fifth column vector as follows:

$$\alpha^{m+1}=1, u^{m+1}=\eta^{-1}u^m, \hat{x}_{D_k,B}^{m+1}=x_{D_k,B}^{m-1}, \hat{y}_k^{m+1}=y_k^{m-1}$$

(o) transmitting the updated variant $\hat{y}_k^{m+1}$ of the fifth column vector to the $k^{th}$ distribution network and executing step (p);

(p) letting m=m+1 and returning to step (b).

13. A non-transitory computer-readable storage medium having stored therein instructions that, when executed by a processor of a terminal, causes the terminal to perform a reactive power-voltage control method for running an application program, the reactive power-voltage control method comprising:

establishing a reactive power-voltage control model for a power system consisting of a transmission network and a plurality of distribution networks, wherein the plurality of distribution networks are radial in nature, the reactive power-voltage control model comprises an objective function and a plurality of constraints, the objective function is established for minimizing a sum of active power outputs of generators at a slack bus in the transmission network, and the plurality of constraints include a plurality of transmission network constraints, a plurality of distribution network constraints and a plurality of transmission-distribution network boundary constraints;

performing a second order cone relaxation on a non-convex constraint of the plurality of distribution network constraints to obtain a convex-relaxed reactive power-voltage control model;

solving the convex-relaxed reactive power-voltage control model to acquire control variables of the transmission network and control variables of each distribution network; and performing coordinated reactive power-voltage control on the transmission network and each distribution network based on the control variables of the transmission network and the control variables of the distribution network, wherein the objective function is represented as:

$$\min \sum_{i \in G_{PCC}^T} P_i^G$$

where $G_{PCC}^T$ represents a set of indexes of the generators at the slack bus in the transmission network, and $P_i^G$ represents an active power output of an $i^{th}$ generator in $G_{PCC}^T$, wherein the plurality of transmission network constraints comprise a first power flow constraint, a first power input equilibrium constraint, a first voltage limit constraint, a first power output constraint, and a first line capacity constraint;

wherein the first power flow constraint is represented as:

$$P_{ij} = \frac{1}{\tau_{ij}^2}g_{ij}^\varepsilon V_i^2 - \frac{1}{\tau_{ij}}V_iV_j[g_{ij}^\varepsilon \cos(\theta_i - \theta_j - \phi_{ij}) + b_{ij}^\varepsilon \sin(\theta_j - \theta_j - \phi_{ij})],$$

$$\forall ij \in IL_T$$

$$P_{ji} = g_{ji}^\varepsilon V_j^2 - \frac{1}{\tau_{ij}}V_iV_j[g_{ij}^\varepsilon \cos(\theta_j - \theta_i + \phi_{ij}) + b_{ij}^\varepsilon \sin(\theta_j - \theta_i + \phi_{ij})], \forall ij \in IL_T$$

$$Q_{ij} = -\frac{1}{\tau_{ij}^2}\left(b_{ij}^\varepsilon + \frac{b_{ij}^c}{2}\right)V_i^2 -$$

$$\frac{1}{\tau_{ij}}V_iV_j[g_{ij}^\varepsilon \sin(\theta_i - \theta_j - \phi_{ij}) - b_{ij}^\varepsilon \cos(\theta_i - \theta_j - \phi_{ij})], \forall ij \in IL_T$$

$$Q_{ji} = -\left(b_{ij}^\varepsilon + \frac{b_{ij}^c}{2}\right)V_j^2 - \frac{1}{\tau_{ij}}V_iV_j[g_{ij}^\varepsilon \sin(\theta_j - \theta_i + \phi_{ij}) - b_{ij}^\varepsilon \cos(\theta_j - \theta_i + \phi_{ij})],$$

$$\forall ij \in IL_T$$

where $P_{ij}$ represents an active power flowing from an $i^{th}$ bus to a $j^{th}$ bus in the transmission network, $\tau_{ij}$ represents a transformer ratio of an $(ij)^{th}$ branch in the transmission network, $g_{ij}^\varepsilon$ represents an electric conductance of the $(ij)^{th}$ branch in the transmission network, $V_i$ represents a voltage magnitude of the $i^{th}$ bus in the transmission network, $V_j$ represents a voltage magnitude of the $j^{th}$ bus in the transmission network, $\theta_i$ represents a voltage phase-angle of the $i^{th}$ bus in the transmission network, $\theta_j$ represents a voltage phase-angle of the $j^{th}$ bus in the transmission network, $\phi_{ij}$ represents a transformer phase shifting angle of the (ij)$^{th}$ branch in the transmission network, $b_{ij}^{\varepsilon}$ represents a susceptance of the (ij)$^{th}$ branch in the transmission network, the (ij)$^{th}$ branch represents a branch from the i$^{th}$ bus to the j$^{th}$ bus, $IL_T$ represents a set of indexes of branches in the transmission network, $P_{ji}$ represents an active power flowing from the j$^{th}$ bus to the i$^{th}$ bus in the transmission network, $Q_{ji}$ represents a reactive power flowing from the i$^{th}$ bus to the j$^{th}$ bus in the transmission network, $b_{ij}^{C}$ represents a charging susceptance of the (ij)$^{th}$ branch in the transmission network, $Q_{ji}$ represents a reactive power flowing from the j$^{th}$ bus to the i$^{th}$ bus in the transmission network;

wherein the first power input equilibrium constraint is represented as:

$$\sum_{j \in IG_{Ti}} P_j^G - \sum_{j:ji \in IL_T} P_{ij} - \sum_{j:ij \in IL_T} P_{ij} - P_i^D - V_i^2 g_i^s = 0, \forall i \in IB_T$$

$$\sum_{j \in IG_{Ti}} Q_j^G - \sum_{j:ji \in IL_T} Q_{ij} - \sum_{j:ij \in IL_T} Q_{ij} - Q_i^D + V_i^2 b_i^s = 0, \forall i \in IB_T$$

where $IG_{Ti}$ represents a set of indexes of generators connected to the i$^{th}$ bus in the transmission network, $P_j^G$ represents an active power output of a j$^{th}$ generator, $P_i^D$ represents an active load of the i$^{th}$ bus in the transmission network, $g_i^S$ represents a parallel conductance of the i$^{th}$ bus in the transmission network, $IB_T$ represents a set of indexes of buses in the transmission network, $Q_j^G$ represents a reactive power output of the j$^{th}$ generator, $Q_i^D$ represents a reactive load of the i$^{th}$ bus in the transmission network, $b_i^S$ represents a parallel susceptance of the i$^{th}$ bus in the transmission network;

wherein the first voltage limit constraint is represented as:

$\underline{V_i} \leq V_i \leq \overline{V_i}, \forall i \in IB_T$ where $\underline{V_i}$ represents a lower limit of the voltage magnitude of the i$^{th}$ bus in the transmission network, and $\overline{V_i}$ represents an upper limit of the voltage magnitude of the i$^{th}$ bus in the transmission network;

wherein the first power output constraint is represented as:

$\underline{P_i^G} \leq P_i^G \leq \overline{P_i^G}, \underline{Q_i^G} \leq Q_i^G \leq \overline{Q_i^G}, \forall i \in IG_T$ where $IG_T$ represents a set of indexes of generators in the transmission network, $\underline{P_i^G}$ represents a lower limit of an active power of an i$^{th}$ generator, and $\overline{P_i^G}$ represents an upper limit of the active power of the i$^{th}$ generator, $\underline{Q_i^G}$ represents a lower limit of a reactive power of an i$^{th}$ generator, and $\overline{Q_i^G}$ represents an upper limit of the reactive power of the i$^{th}$ generator;

wherein the first line capacity constraint is represented as:

$P_{ij}^2 + Q_{ij}^2 \leq \overline{S_{ij}}^2, P_{ji}^2 + Q_{ji}^2 \leq \overline{S_{ij}}^2, \forall ij \in IL_T$ where $\overline{S_{ij}}$ represents an apparent power capacity of the (ij)$^{th}$ branch in the transmission network.

\* \* \* \* \*